(12) United States Patent
Azad

(10) Patent No.: US 10,938,163 B2
(45) Date of Patent: Mar. 2, 2021

(54) ELECTROMAGNETIC INTERFERENCE (EMI) GROUNDING PROTECTION METHOD FOR A CONNECTOR USING A MULTI-DIRECTIONAL CONDUCTIVE HOUSING

(71) Applicant: J.S.T. CORPORATION, Farmington Hills, MI (US)

(72) Inventor: Vikas Azad, Novi, MI (US)

(73) Assignee: J.S.T. CORPORATION, Farmington Hills, MI (US)

( * ) Notice: Subject to any disclaimer, the term of this patent is extended or adjusted under 35 U.S.C. 154(b) by 0 days.

(21) Appl. No.: 16/504,287

(22) Filed: Jul. 7, 2019

(65) Prior Publication Data

US 2020/0176937 A1 Jun. 4, 2020

Related U.S. Application Data

(60) Provisional application No. 62/775,103, filed on Dec. 4, 2018, provisional application No. 62/802,829, filed on Feb. 8, 2019.

(51) Int. Cl.
*H01R 13/6599* (2011.01)
*B60R 16/03* (2006.01)
(Continued)

(52) U.S. Cl.
CPC ......... *H01R 13/6599* (2013.01); *B60R 16/03* (2013.01); *H01R 13/426* (2013.01);
(Continued)

(58) Field of Classification Search
CPC .................................................. H01R 13/6599
(Continued)

(56) References Cited

U.S. PATENT DOCUMENTS 4,090,768 A * 5/1978 Tregoning ........... H01R 13/516
439/607.41
4,236,779 A 12/1980 Tang
(Continued)

OTHER PUBLICATIONS

International Search Report for International Application No. PCT/US19/63068 dated Feb. 11, 2020 (4 sheets).
(Continued)

*Primary Examiner* — Abdullah A Riyami
*Assistant Examiner* — Marcus E Harcum
(74) *Attorney, Agent, or Firm* — Kratz, Quintos & Hanson, LLP

(57) ABSTRACT

An electromagnetic interference (EMI) grounding protection method for a connector assembly using a multi-directional conductive housing. The method includes the steps of: conducting the EMI generated by a source towards a metallic braided shield, the metallic braided shield being secured and mounted onto the multi-directional conductive housing by a metallic clamp; conducting the EMI from the metallic braided shield to the metallic clamp and to the multi-directional conductive housing, the multi-directional conductive housing being mounted onto a metallic device by at least a metallic bolt and the bolt being accommodated within a corresponding metallic compression limiter; and thereafter, conducting the EMI: (1) from the metallic braided shield to the multi-directional conductive housing through the metallic compression limiters and through their respective bolts, and ultimately to the metallic device, and (2) from the metallic braided shield to the multi-directional conductive housing directly through conductive pads thereof, and ultimately to the metallic device.

14 Claims, 21 Drawing Sheets

(51) Int. Cl.
*H01R 13/502* (2006.01)
*H01R 13/6581* (2011.01)
*H01R 13/6596* (2011.01)
*H01R 13/74* (2006.01)
*H01R 13/426* (2006.01)
*H01R 13/436* (2006.01)
*H01R 13/52* (2006.01)
*H01R 13/53* (2006.01)
*H01R 13/73* (2006.01)
*H01R 43/20* (2006.01)
*H01R 13/533* (2006.01)
*H01R 13/6598* (2011.01)

(52) U.S. Cl.
CPC ....... *H01R 13/4367* (2013.01); *H01R 13/502* (2013.01); *H01R 13/5202* (2013.01); *H01R 13/53* (2013.01); *H01R 13/533* (2013.01); *H01R 13/6581* (2013.01); *H01R 13/6596* (2013.01); *H01R 13/73* (2013.01); *H01R 13/748* (2013.01); *H01R 43/20* (2013.01); *H01R 13/6598* (2013.01); *H01R 2201/26* (2013.01)

(58) Field of Classification Search
USPC ...... 439/607.41, 607.28, 607.47, 607.44, 95, 439/97, 98
See application file for complete search history.

(56) References Cited

U.S. PATENT DOCUMENTS

| | | | | |
|---|---|---|---|---|
| 4,433,206 | A | 2/1984 | Lewis | |
| 4,531,805 | A | 7/1985 | Werth | |
| 4,684,192 | A | 8/1987 | Long | |
| 4,886,463 | A | 12/1989 | Scott | |
| 4,975,085 | A | 12/1990 | Cartesse | |
| 5,326,947 | A | 7/1994 | Edds | |
| 5,531,614 | A | 7/1996 | Gallusser | |
| 6,083,014 | A | 7/2000 | Bogdan | |
| 6,554,623 | B2 | 4/2003 | Yoshioka | |
| 6,595,801 | B1 | 7/2003 | Leonard | |
| 6,815,610 | B2 | 11/2004 | Kuboshima | |
| 6,921,292 | B2 | 7/2005 | Miyazaki | |
| 7,104,822 | B2 | 9/2006 | Jazowski | |
| 7,165,995 | B2 | 1/2007 | Fukushima | |
| 7,182,612 | B1 | 2/2007 | Immethun | |
| 7,462,043 | B2* | 12/2008 | Deisenhofer | H01R 4/646 411/149 |
| 7,572,150 | B2* | 8/2009 | Matsuoka | H01R 13/207 439/626 |
| 7,597,587 | B1* | 10/2009 | Duesterhoeft | H01R 13/629 439/545 |
| 7,613,003 | B2 | 11/2009 | Pavlovic | |
| 7,614,910 | B2 | 11/2009 | Croteau | |
| 7,632,148 | B1 | 12/2009 | Kawamura | |
| 7,811,105 | B1 | 10/2010 | Tan Chin Yaw | |
| 7,950,942 | B2* | 5/2011 | Klinger | H01R 13/6215 439/247 |
| 8,167,653 | B2* | 5/2012 | Hasegawa | H01R 13/6593 439/607.41 |
| 8,231,399 | B2* | 7/2012 | Daubigney | H01R 13/6275 439/247 |
| 8,262,413 | B2 | 9/2012 | Fujiwara | |
| 8,535,091 | B2* | 9/2013 | Fu | H01R 13/748 439/545 |
| 8,562,377 | B2* | 10/2013 | Kawamura | H01R 9/032 439/607.44 |
| 8,747,157 | B2 | 6/2014 | Tashiro | |
| 8,986,045 | B2 | 3/2015 | Okamoto | |
| 8,992,249 | B2 | 3/2015 | Kobayashi | |
| 9,040,846 | B2 | 5/2015 | Suzuki | |
| 9,252,509 | B2 | 2/2016 | Kato | |
| 9,337,577 | B1 | 5/2016 | Hitchcock | |
| 9,431,727 | B2 | 8/2016 | Kato | |
| 9,431,771 | B1* | 8/2016 | Sundarakrishnamachari | H01R 13/514 |
| 9,496,656 | B2 | 11/2016 | Hsu | |
| 9,640,965 | B1 | 5/2017 | Long | |
| 9,674,994 | B2* | 6/2017 | Yoshida | H01R 13/6593 |
| 9,716,374 | B2 | 7/2017 | Rohr | |
| 9,722,361 | B2* | 8/2017 | Tanaka | H01R 13/6592 |
| 9,948,038 | B2 | 4/2018 | Katou | |
| 10,062,974 | B2* | 8/2018 | Okamoto | H01R 13/6397 |
| 10,243,293 | B2* | 3/2019 | Umemura | H01R 13/512 |
| 10,340,625 | B2* | 7/2019 | Umemura | H01R 13/6581 |
| 2002/0031949 | A1 | 3/2002 | Miyazaki | |
| 2002/0042228 | A1 | 4/2002 | Yoshioka | |
| 2002/0048994 | A1 | 4/2002 | Oota | |
| 2002/0098737 | A1 | 7/2002 | Koide | |
| 2003/0008555 | A1* | 1/2003 | Obata | H01R 13/6582 439/578 |
| 2004/0057187 | A1* | 3/2004 | Kuboshima | H01R 13/5845 361/118 |
| 2004/0106325 | A1 | 6/2004 | Miyazaki | |
| 2004/0235351 | A1 | 11/2004 | Aisenbrey | |
| 2005/0215122 | A1* | 9/2005 | Nishida | H01R 13/648 439/607.41 |
| 2007/0149008 | A1 | 6/2007 | Pabst | |
| 2007/0270037 | A1 | 11/2007 | Deterre | |
| 2009/0124121 | A1 | 5/2009 | Matsuoka | |
| 2009/0137153 | A1* | 5/2009 | Yoshioka | H01R 13/506 439/607.24 |
| 2009/0149048 | A1 | 6/2009 | Pavlovic | |
| 2009/0181571 | A1 | 7/2009 | Willing | |
| 2010/0216323 | A1* | 8/2010 | Kawamura | H01R 13/6593 439/95 |
| 2010/0255728 | A1* | 10/2010 | Matsuoka | H01R 4/302 439/607.55 |
| 2010/0261364 | A1 | 10/2010 | Matsuoka | |
| 2010/0279555 | A1 | 11/2010 | Azad | |
| 2011/0045701 | A1* | 2/2011 | Tsuruta | H01R 9/032 439/607.44 |
| 2012/0021632 | A1 | 1/2012 | Matsumoto | |
| 2012/0155988 | A1 | 6/2012 | Schumacher | |
| 2012/0252272 | A1 | 10/2012 | Omae | |
| 2013/0017719 | A1 | 1/2013 | Tanaka | |
| 2013/0078872 | A1* | 3/2013 | Tashiro | H01R 13/4223 439/695 |
| 2013/0189879 | A1* | 7/2013 | Kondo | H01R 9/18 439/607.44 |
| 2013/0295786 | A1* | 11/2013 | Dinh | H01R 4/46 439/97 |
| 2014/0011401 | A1 | 1/2014 | Endo | |
| 2014/0038459 | A1 | 2/2014 | Kobayashi | |
| 2014/0127063 | A1 | 5/2014 | Itsuki | |
| 2014/0287631 | A1 | 9/2014 | Tashiro | |
| 2014/0302711 | A1* | 10/2014 | Suzuki | H01R 13/5202 439/556 |
| 2014/0370753 | A1 | 12/2014 | Kobayashi | |
| 2015/0050826 | A1 | 2/2015 | Tashiro | |
| 2015/0079859 | A1 | 3/2015 | Glick | |
| 2015/0087190 | A1 | 3/2015 | Schwan | |
| 2015/0270650 | A1* | 9/2015 | Bower | H01R 13/405 439/607.02 |
| 2015/0280381 | A1 | 10/2015 | Rangi | |
| 2016/0134049 | A1 | 5/2016 | Kataoka | |
| 2016/0172784 | A1 | 6/2016 | Kataoka | |
| 2016/0181735 | A1* | 6/2016 | Higashi | H01R 13/6593 439/607.41 |
| 2016/0181736 | A1 | 6/2016 | Hsu | |
| 2016/0233625 | A1 | 8/2016 | Kato | |
| 2016/0329651 | A1 | 11/2016 | Yamaguchi | |
| 2016/0329661 | A1 | 11/2016 | Fischer | |
| 2016/0380390 | A1* | 12/2016 | Kusamaki | H01R 9/034 439/607.44 |
| 2017/0303446 | A1 | 10/2017 | Johansson | |

(56) References Cited

U.S. PATENT DOCUMENTS

2017/0338600 A1 11/2017 Tanaka
2018/0034200 A1 2/2018 Rhein

OTHER PUBLICATIONS

Written Opinion of the International Searching Authority for International Application No. PCT/US19/63068 dated Feb. 11, 2020 (9 sheets).
International Search Report for International Application No. PCT/US19/45971 dated Feb. 6, 2020 (3 sheets).
Written Opinion of the International Searching Authority for International Application No. PCT/US19/45971 dated Feb. 6, 2020 (6 sheets).
Demaratos, David; U.S. Appl. No. 16/447,731, filed Jun. 20, 2019.
Azad, Vikas; U.S. Appl. No. 16/504,288, filed Jul. 7, 2019.
Demaratos, David; U.S. Appl. No. 16/536,123, filed Aug. 8, 2019.
Demaratos, David; U.S. Appl. No. 16/583,915, filed Sep. 26, 2019.
Azad, Vikas; U.S. Appl. No. 16/370,069, filed Mar. 29, 2019.
Azad, Vikas; U.S. Appl. No. 16/369,943, filed Mar. 29, 2019.
Written Opinion of the International Searching Authority for International Application No. PCT/US2019/062861 dated Jan. 14, 2020 (8 sheets).
International Search Report for International Application No. PCT/US2019/062861 dated Jan. 14, 2020 (3 sheets).
International Search Report for International Application No. PCT/US19/42437 dated Oct. 21, 2019 (3 sheets).
Written Opinion of the International Searching Authority for International Application No. PCT/US19/42437 dated Oct. 21, 2019 (6 sheets).
Office Action of U.S. Appl. No. 16/369,943 dated Jan. 22, 2020.
Office Action of U.S. Appl. No. 16/536,123 dated Mar. 10, 2020.
Office Action of U.S. Appl. No. 16/370,069 dated Dec. 3, 2019.
Office Action of U.S. Appl. No. 16/447,731 dated Feb. 6, 2020.
Office Action of U.S. Appl. No. 16/370,069 dated Apr. 4, 2020.
Written Opinion of the International Searching Authority for International Application No. PCT/US2020/015929 dated Apr. 20, 2020 (6 sheets).
International Search Report for International Application No. PCT/US2020/015929 dated Apr. 20, 2020 (2 sheets).
International Preliminary Report on Patentability for International Application No. PCT/US2019/062861 dated Apr. 21, 2020 (12 sheets).

* cited by examiner

US 10,938,163 B2

ELECTROMAGNETIC INTERFERENCE (EMI) GROUNDING PROTECTION METHOD FOR A CONNECTOR USING A MULTI-DIRECTIONAL CONDUCTIVE HOUSING

CROSS-REFERENCE TO RELATED APPLICATIONS

This patent application claims priority to U.S. Provisional Patent Application No. 62/775,103 filed Dec. 4, 2018 and U.S. Provisional Patent Application No. 62/802,829 filed Feb. 8, 2019, which are hereby incorporated herein by reference in their entireties.

BACKGROUND OF THE INVENTION

It is desired that a high voltage connector assembly connected to a device be provided. It is further desired that the high voltage connector assembly experiences a reduced or suppressed electromagnetic interference (EMI) through conductive seals and a multi-directional conductive housing.

SUMMARY OF THE INVENTION

This invention provides such a high voltage connector for connecting to a device which, when in operation, experiences reduced or suppressed EMI. This is achieved by providing the connector with a metallic braided shield on top of an inverter outer housing assembly or the like. The connector in this invention is further provided with a metallic clamp that holds the metallic braided shield above a multi-directional conductive outer housing, and provides a conductive contact between the metallic braided shield and the multi-directional conductive outer housing. The multi-directional conductive outer housing, which is made of a metal-infused plastic, resin, nylon, or the like, includes an over-molded silicone seal to provide the necessary sealing and insulation layer to prevent galvanic corrosion between the connector and the device to which the connector is connected. The outer housing may also be made of a stainless steel fiber-filled plastic, resin, nylon, or the like. The metal-infused or stainless steel fiber-filled outer housing with the over-molded silicone shield includes apertures through which bolts pass through for fastening the connector of the invention to the device. The bolts provide the necessary grounding among the metallic braided shield, metal-infused plastic outer housing, and the device to which the connector of this invention is to be connected. Each bolt is preferably inserted into a corresponding metallic compression limiter within a respective one of the apertures of the outer housing. A ground system is provided to the connector of this invention by establishing a contact between the connector and the device, with the connection of the connector to the device, by the bolts and the metallic compression limiters. Moreover, the steel bolts are contained within the metallic compression limiters, which are in turn contained within side apertures of the outer housing. On the outer periphery of the base of the metal-infused outer housing is an over-molded silicone seal, which, along with the above-described structural arrangement composed of dissimilar metals, provides for corrosive resistant characteristics.

The connector of this invention further includes an inner housing provided within the outer housing, the inner housing further having cable reinforcement retainer assemblies securely inserted therein. The inner housing accommodates therein the cables that are directed to a desired direction in conjunction with the conductive outer housing having angled parts or multi-directional parts.

The connector of this invention further includes a back cover, which acts as a terminal position assurance (TPA) device, through which cables slide and secured thereinto, during the assembly of the connector. The back cover includes over-molded silicone seals for isolating the connecting interface of the cables. During assembly of the connector, the back cover ensures that the inner housing is properly positioned within the outer housing. The outer housing is inclined (i.e., a part thereof extending in one direction, while another part extends in another direction) so as to accommodate therein the cables extending to any direction. In this case, the outer housing has a part extending in one direction, and another part extending in another direction, the two directions being orthogonal to each other, although the shape of the outer housing is not limited thereto.

Generally, upon assembly of the connector of this invention, an inverter outer housing assembly, having the metal-infused plastic outer housing with the over-molded silicone seal, is mounted onto the associated device with the bolts accommodated within the respective metallic compression limiters; the inner housing is seated inside and onto the base of the outer housing; the back cover with its associated cables and cable reinforcement retainer assemblies are mounted inside the angled outer housing and onto the inner housing with the cables being slid upwards through the back cover; the metallic braided shield is mounted onto the outer housing while covering the exposed cable; and the clamp is slid along the braided shield to secure thereof onto the outer housing.

In, for example, an electric vehicle or a hybrid vehicle, EMI is a noise generated by, e.g., a high voltage source (such as, a battery or a set of conducting high voltage cables connected to the battery). Electrical shielding becomes important in reducing, suppressing, or eliminating EMI noise between components within the vehicle so as to avoid any loss of any or all of vehicle function. Proper grounding of all the shielding components is important to suppress, reduce, or remove all EMI noise from the system. This invention uses, for example, conductive housing (made of a metal-infused conductive plastic, resin, nylon, or the like, or made of a stainless steel fiber-filled plastic, resin, nylon, or the like), metallic compression limiters, metallic clamp, metallic braided shield, and metallic bolts to ground the connector assembly of this invention and suppress, reduce, or eliminate EMI noise. The EMI electric noise, generated by the, for example, vehicle battery flows through the metallic braided shield then conducted to the metallic clamp to the conductive housing, which includes parts that are angled relative to each other, to the metallic compression limiters to the metallic bolts, and then to the associated metallic device onto which the connector assembly is mounted. Alternatively, the EMI electric noise, generated by the, for example, vehicle battery or the conducting cables that are connected thereto flows through the metallic braided shield then conducted to the metallic clamp to the multi-directional conductive housing, which includes parts that are angled relative to each other, and then directly to the associated metallic device onto which the connector assembly is mounted.

BRIEF DESCRIPTION OF THE DRAWINGS

FIG. 3A is a top perspective view of the outer housing, while

FIG. 7A is a top perspective view of an inner housing showing a back portion and a top portion thereof, while

FIG. 11A is an elevational view of a first side portion of the end terminal and a first side portion of the clamp of the cable reinforcement retainer assembly, while

FIG. 12A illustrates a perspective view of a bottom portion and a back portion of a back cover, while

FIG. 13A is a perspective view of a top portion and a front portion of the back cover; while

DETAILED DESCRIPTION OF THE PREFERRED EMBODIMENTS

Figure 1:
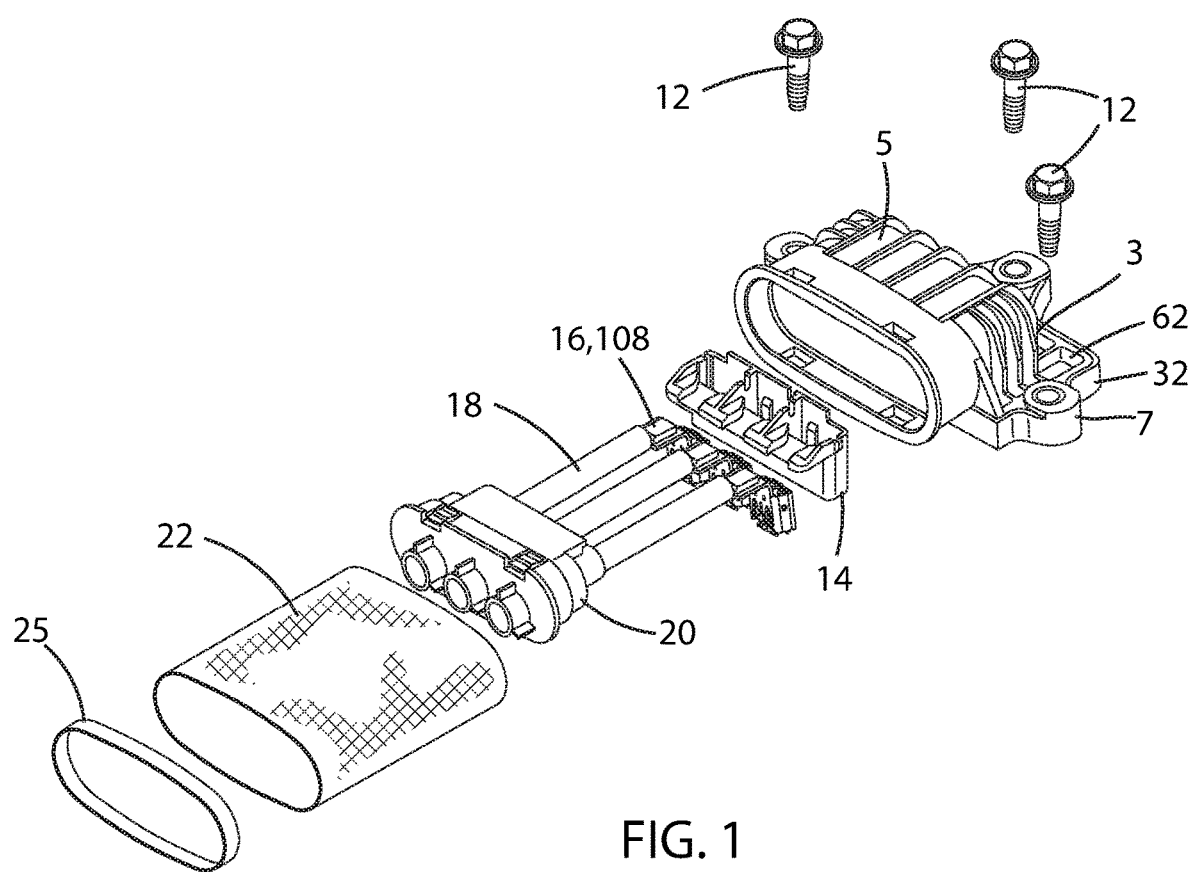
FIG. 1 is an exploded view of the high voltage connector of this invention, generally referred to by reference number 1, showing the different elements thereof arranged in the horizontal direction ready to be mounted onto an associated device.

As illustrated in FIG. 1, the high voltage connector 1 includes an outer housing assembly 3, which includes an angled, multi-directional, or horizontal conductive outer housing 5 with an accompanying over-molded silicone seal 7. In this case, the multi-directional conductive outer housing 5 includes a part that extends vertically and another part that extends in the horizontal direction orthogonal to the vertically extending part, although the multi-directional conductive outer housing 5 of this invention is not limited thereto. The multi-direction conductive outer housing 5 is preferably made of a metal-infused housing, and includes side extending portions 62 of a base 32 thereof for accommodating therein respective bolts 12 (made of stainless steel or the like) for fastening the connector 1 to an associated device 210 (see, FIG. 15; e.g., an inverter or the like made of, e.g., aluminum).

Accommodated within the outer housing 5 and mounted onto the base 32 thereof is an inner housing 14. The connector 1 further includes a set of cable reinforcement retainer assemblies 16 (specifically referred to as reference number 108 in FIGS. 9, 10, 11A, and 11B) for coupling with the inner housing 14 and a set of cables 18. The set of cables 18 is preferably high voltage cables (e.g., 25 mm$^2$ cables), although the type of cables is not limited thereto. Although shown in FIG. 1 is a set of 3-way high voltage cables, this embodiment is also not limited thereto. The cables 18 are slidably accommodated within a back cover 20. The connector 1 further includes a metallic (e.g., stainless steel) braided shield 22, which forms the outer layer of the connector 1, when the connector 1 is fully assembled, as shown in FIG. 2B. A metallic clamp 25 secures the braided shield 22 onto the outer housing 5, when the connector 1 is fully assembled, as also shown in FIG. 2B.

Figure 2A:
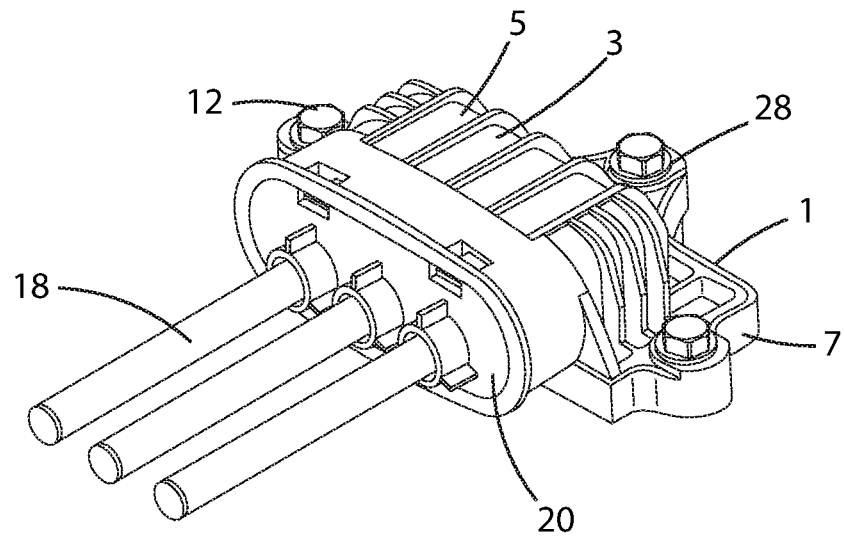
FIG. 2A is a perspective view of a fully assembled connector of this invention, absent the braided shield, with the cables exposed.
Figure 2B:
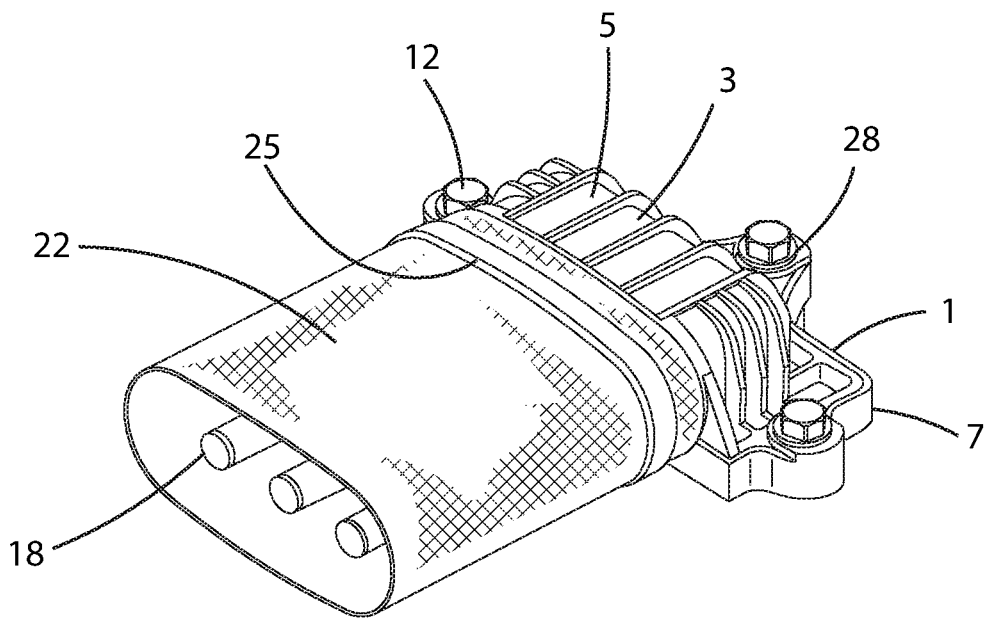
FIG. 2B is a perspective view of the fully assembled connector of this invention showing the braided shield fully secured to the outer housing with the metallic clamp.

FIG. 2A illustrates the connector 1 when fully assembled absent the braided shield 22, while FIG. 2B illustrates the connector 1 when fully assembled with the braided shield 22 secured onto the outer housing 5 by the metallic clamp 25. Further shown in FIG. 2A is the outer housing assembly 3 with the outer housing 5 that securely sits onto and within the outer-molded silicone seal 7 through which the bolts 12 are fastened with respective metallic compression limiters 28, which are made of aluminum or the like. As later discussed, the set of cables 18 extend through an upper portion 30 of the outer housing 5.

In FIG. 2B, covered by the metallic braided shield 22 are the set of cables 18. The metallic clamp 25 ensures that the bottom portion 33 of the metallic braided shield 22 is connected to the upper portion 30 of the outer housing 5.

Figure 3A:
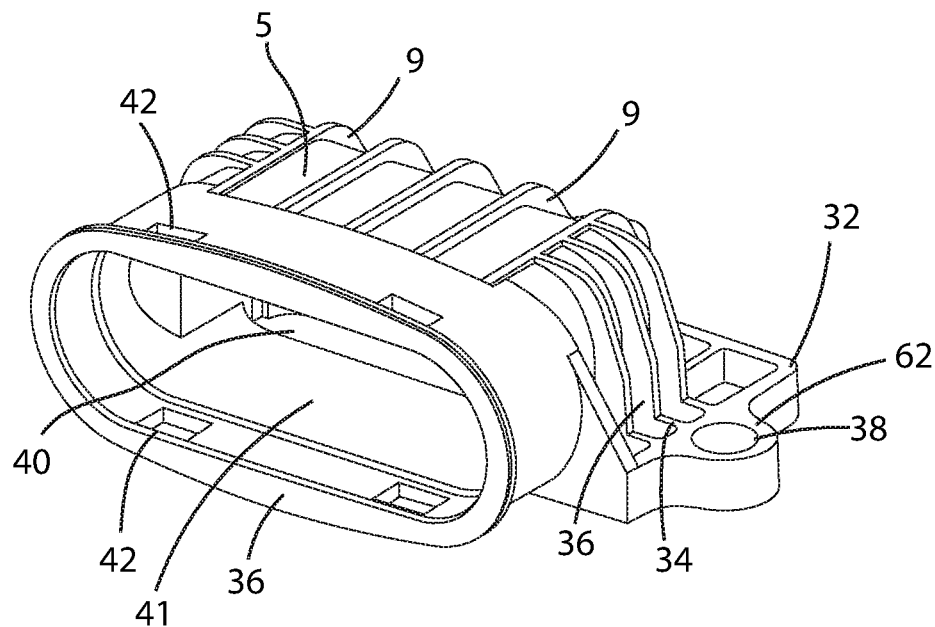

Extending in the horizontal direction, as illustrated in FIG. 3A, is the outer housing 5 having the base 32 with horizontal ribs 34 extending from a side of the base 32 towards a central portion 36 of the outer housing 5. Also shown in FIG. 3A, with respect to the outer housing 5 and as discussed earlier, are the extending side portions or ribs 9 and side apertures 38 for accommodating therein, along with the silicone seal 7, the respective bolts 12 and the respective metallic compression limiters 28. The outer housing 5 is preferably made of a metal-infused plastic, while the bolts 12 are preferably made of stainless steel or the like.

Passing through the central portion 36 of the outer housing 5 is a central opening 40 for accommodating therein, in full, the inner housing 14 and the cable reinforcement retainer assembly 16, and for further accommodating therein, in part, the set of cables 18. Apertures 42 pass through an upper portion of the outer housing 5.

Figure 3B:
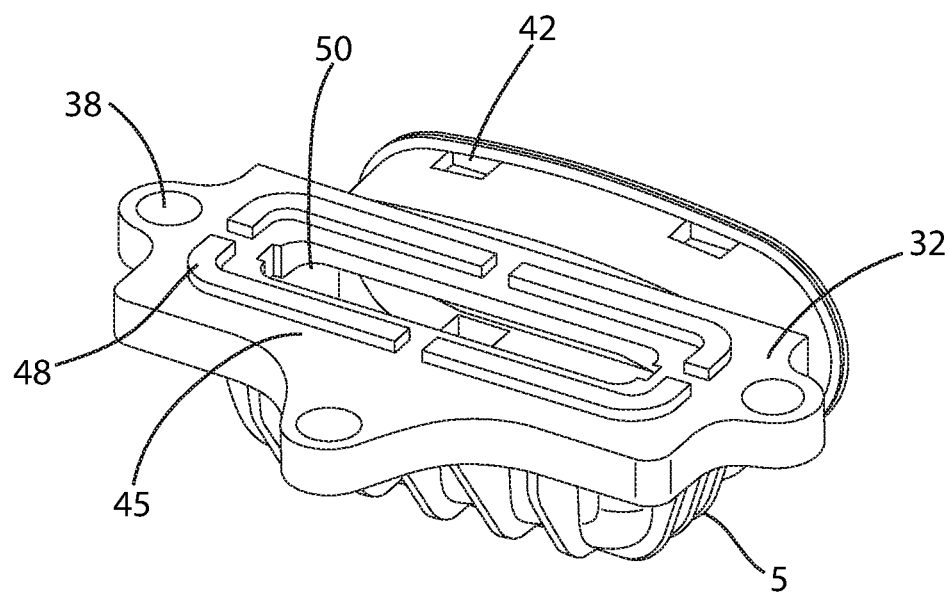
FIG. 3B is a bottom perspective view of the outer housing.

Illustrated in FIG. 3B is the bottom end portion 45 of the outer housing 5. The bottom end portion 45 is substantially flat and includes at least a pad 48 extending therefrom. The pad 48 surrounds a bottom opening or aperture 50 passing through the bottom end portion 45 of the base 32 of the outer housing 5. When the outer housing 5 is mounted onto an associated device 210 (see, FIG. 15), the pad 48 provides the necessary means for substantially reducing or substantially deleting any occurrence of EMI. The bottom opening or aperture 50 is preferably smaller in size than the central aperture 40 of the outer housing 5, and communicates therewith.

Figure 4A:
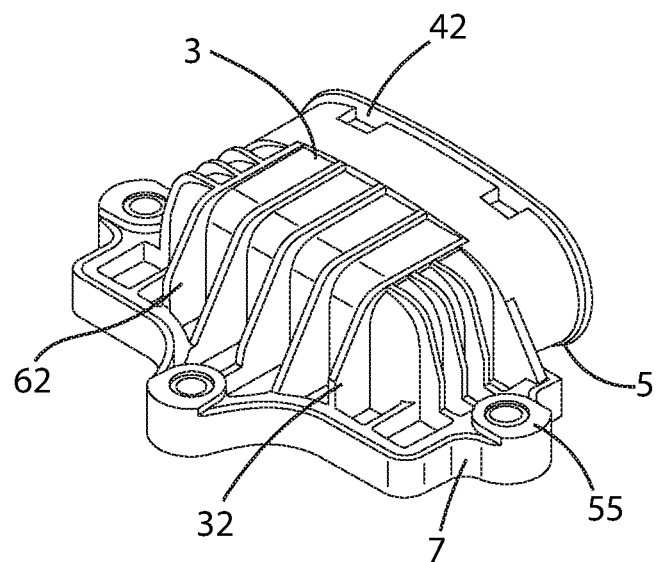
FIG. 4A is a top perspective view of the outer housing surrounded on a bottom periphery thereof with a corresponding over-molded silicone seal.

FIG. 4A shows the outer housing assembly 3, which comprises the outer housing 5 and the over-molded silicone seal 7, the base 32 of the outer housing 5 sitting onto and within the over-molded silicone seal 7. The over-molded silicone seal 7 provides a sealing and insulation layer for galvanic corrosion protection between the connector 1 and the device 210.

Figure 4B:
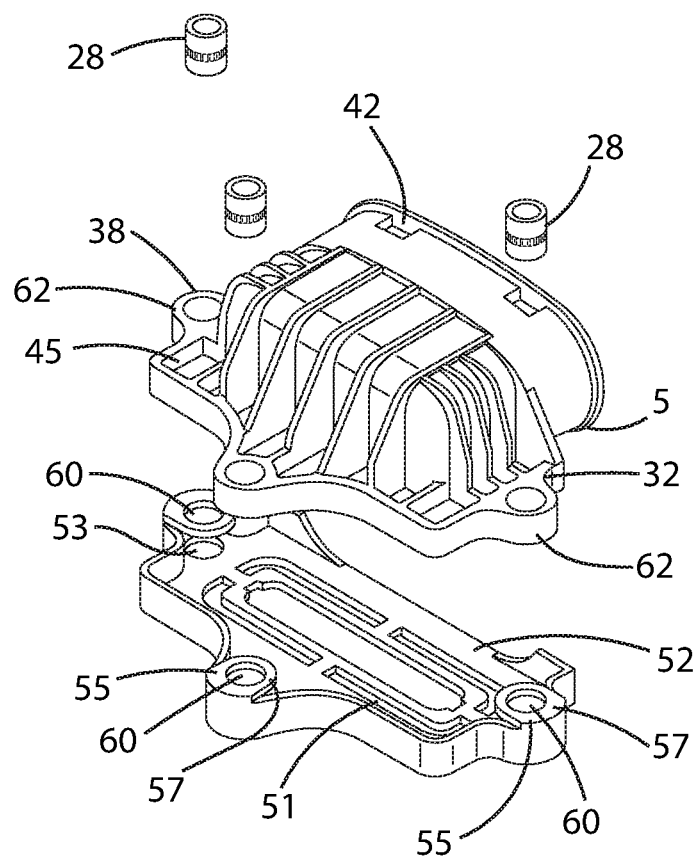
FIG. 4B is an exploded view of the outer housing and the corresponding over-molded silicone seal with the compression limiters that fit within coincident apertures of the outer housing and the silicone seal.

In FIG. 4B, illustrated is an exploded view of the outer housing assembly 3 showing the outer housing 5 and its corresponding over-molded silicone seal 7. As described earlier with respect to the outer housing 5 shown in FIGS. 3A and 3B, the outer housing 5 includes a base 32 with a bottom end portion 45. As also described with respect to FIG. 3B, the base end portion 45 includes the pad 48, which fits and passes through elongated slits 51 passing through a base 52 of the over-molded silicone seal 7 (see, FIG. 4B). As further described with respect to FIG. 3B, the substantially flat bottom end portion 45 of the outer housing 5 sits and mounts onto the base portion 52 of the over-molded silicone seal 7, as shown in FIGS. 4A and 4B. In the over-molded silicone seal 7, shown in FIG. 4B, the base portion 52 includes side apertures 53, while an upper portion 55 of the silicone seal 7 includes side members 57, each of the side member 57 having an aperture 60 passing therethrough. As shown in FIG. 4A, each upper portion 55 of the silicone seal 7 fits onto one of the side extending portions 62 of the base 32 of the outer housing 5. Thus, each aperture 60 of each one of the side member 57 of the silicone seal 7 corresponds to a respective one of the apertures 38 of the base 32 of the outer housing 5 for respectively accommodating therein the metallic compression limiters 28.

Figure 5A:
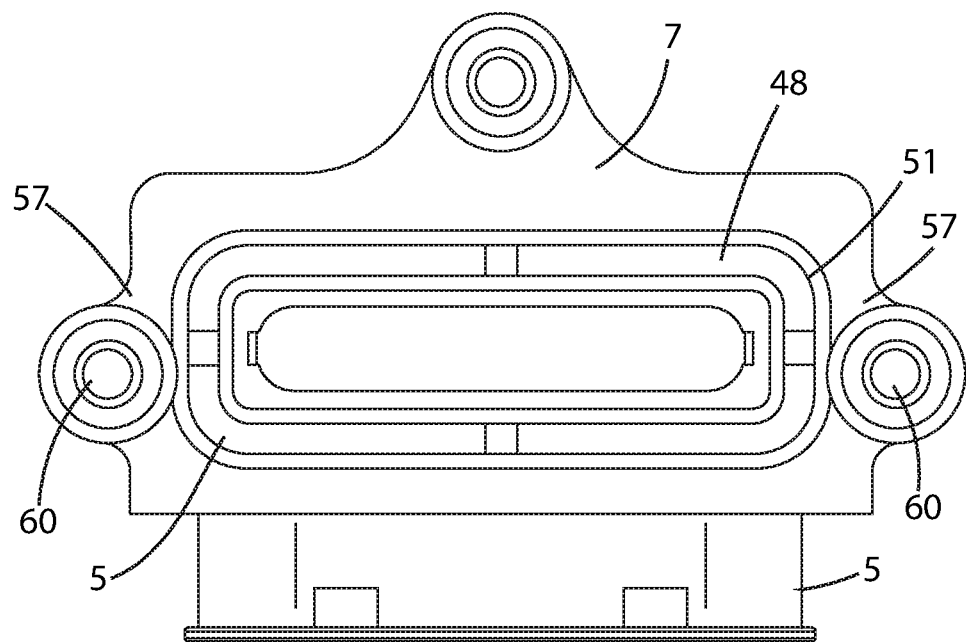
FIG. 5A is a bottom elevational view of a base end portion of the outer housing assembly showing a pad of the outer housing passing through elongated slits of a base of the over-molded silicone seal.
Figure 5B:
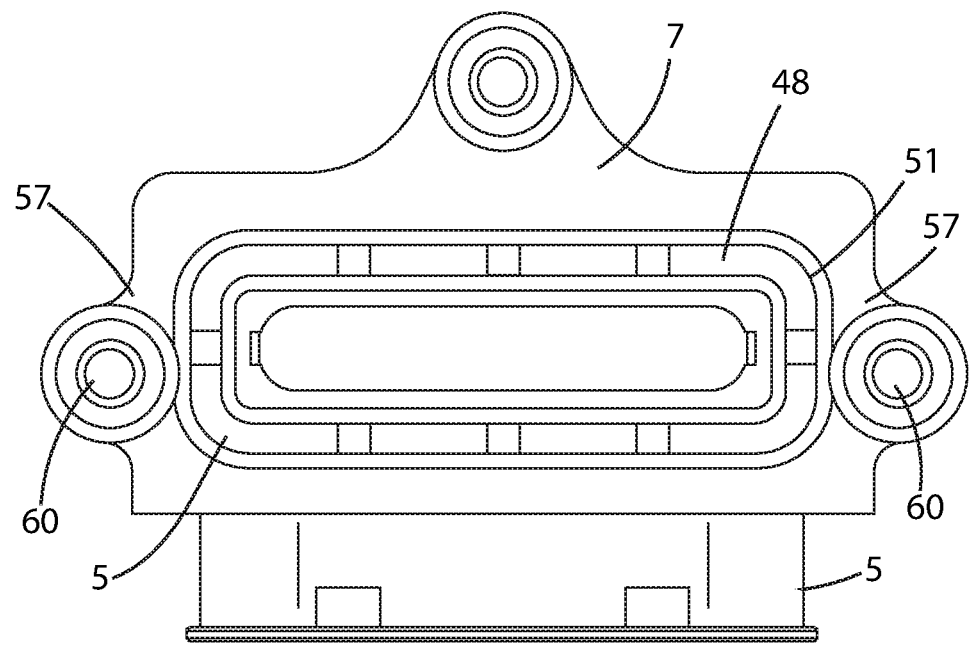
FIG. 5B is a bottom elevational view of the base end portion of the outer housing assembly showing another embodiment or pattern of the pad of the outer housing passing through another embodiment or pattern of the corresponding elongated slits of the base of the over-molded silicone seal.

FIG. 5A illustrates the bottom end portion 45 of the outer housing assembly 3 with the pads 48 of the outer housing 5 passing through the elongated slits 51 of the silicone seal 7 when the outer housing 5 sits and mounts onto the over-molded silicone seal 7. FIG. 5B illustrates the bottom end portion 45 of the outer housing assembly 3 with the pads 48 of a different embodiment or pattern passing through corresponding elongated slits 51 of a different embodiment or pattern of the silicone seal 7 when the outer housing 5 sits and mounts onto the over-molded silicone seal 7.

Figure 6:
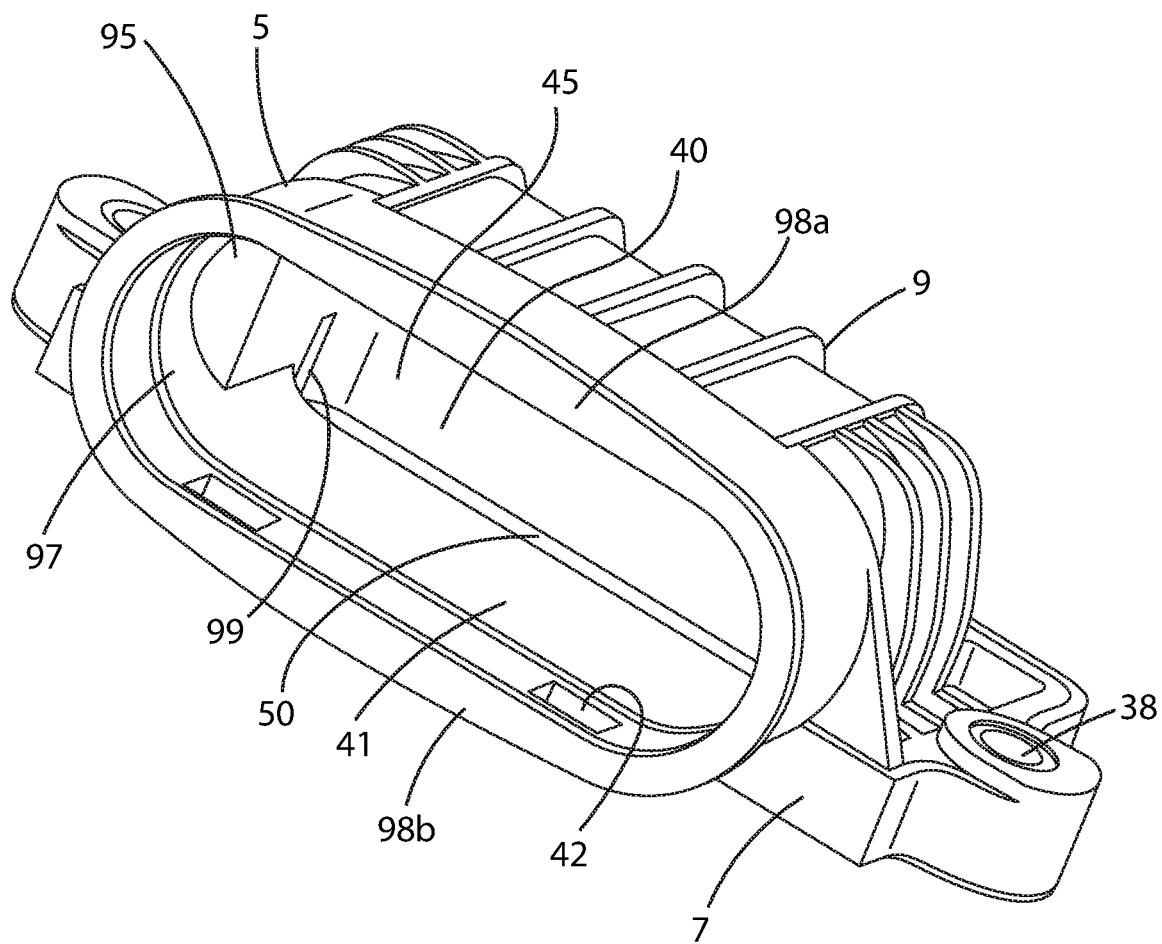
FIG. 6 is a front perspective view of the outer housing showing the inner surface thereof through a central opening thereof.

FIG. 6 is a top perspective view of the outer housing 5 showing the inner surface thereof through a central opening 40 thereof. As can be seen through the central opening 40 of the outer housing 5, as illustrated in FIG. 6, substantially orthogonal to the central opening 40 and communicating therewith is a bottom opening or aperture 50 passing through an end portion 45 substantially orthogonal to the base 32 of the outer housing 5. As further shown in FIG. 6, an inner ledge 95 extends from an inner surface 97 of the outer housing 5. Although not shown in FIG. 6, a similar type of inner ledge 95 extends from the opposite side of the inner surface of the outer housing 5. Also shown in FIG. 6 are outer ledges 98a, 98b extending from an upper portion of the outer housing 5.

Figure 7A:
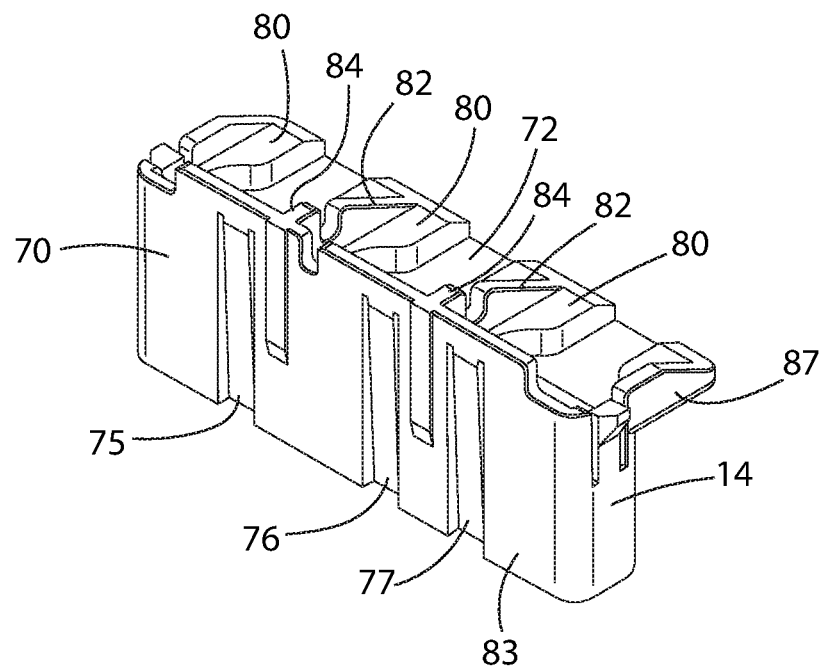

Next described in detail is the inner housing 14, which is accommodated within the outer housing 5 and sits onto the base 32 thereof. The inner housing 14 is preferably made of nylon or the like. The inner housing 14 (preferably made of nylon or the like) provides separation between conductive parts (e.g., the outer housing 5 made of metal-infused plastic or the like and the cable terminals 107 secured inside the inner housing 14). FIG. 7A is a top perspective view of the inner housing 14 showing a back portion 70 and a top portion 72 thereof. The back portion 70 of the inner housing 14 has flexible members 75, 76, 77. The top portion 72 of the inner housing 14 has extending therefrom first portion 80, second portion 82, and third portion 84. The inner housing 14 is generally, as shown in FIG. 7A, an upside down (or inverted) substantially L-shaped structure with a downwardly extending member 83 and a front extending member 87.

Figure 7B:
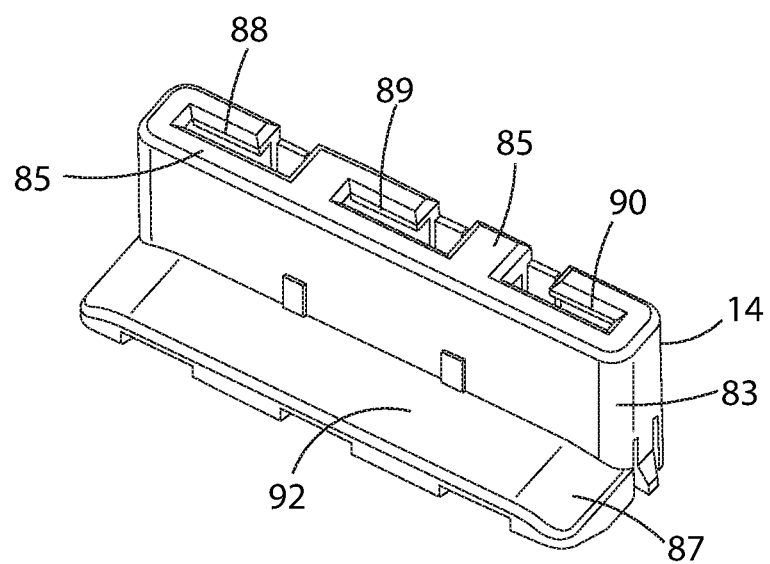
FIG. 7B is a bottom perspective view of the inner housing.

FIG. 7B is a bottom perspective view of the inner housing 14. Shown in FIG. 7B is a bottom end portion 85 of the inner housing 14, the bottom end portion 85 having slots 88, 89, 90 passing therethrough. A front extending member 87 of the inner housing 14 is similarly shown in FIG. 7B as having a bottom surface 92 thereof.

Figure 8:
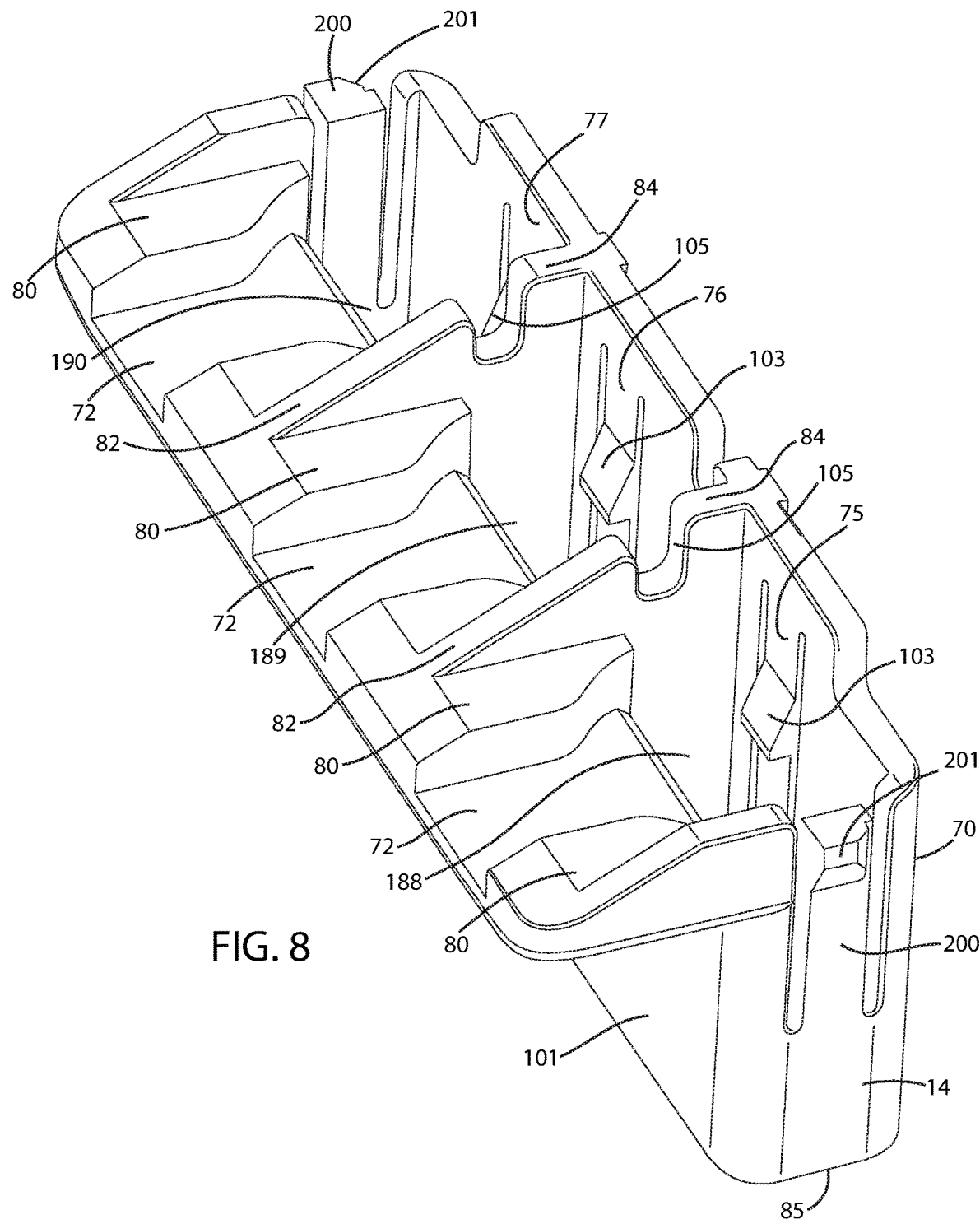
FIG. 8 shows yet another top perspective view of the inner housing illustrating a front portion and the top portion thereof.

FIG. 8 shows yet another top perspective view of the inner housing 14 illustrating a front portion 101 and the top portion 72 thereof. The front portion 101 of the inner housing 14 is opposite the back portion 70 of the inner housing 14 shown in FIG. 7A. Similarly shown in FIG. 8 are the flexible members 75, 76, 77 in the back portion 70 of the inner housing 14. Each of the flexible members 75, 76, 77 has an inclined ledge 103. Extending from the back portion 70 are the first portion 80, the second portion 82, and the third portion 84 (see, also, FIG. 7A). Each second portion 82 extends at an incline relative to the substantially flat and substantially horizontal first portion 80. The top portion 72 of the inner housing 14 is preferably similarly flat and horizontal. Between the second portion 82 and the third portion 84 is a substantially concave portion or indentation portion 105. Upper slots 188, 189, 190 are also shown in FIG. 8, the upper slots 188, 189, 190 communicating with the lower slots 88, 89, 90, respectively, of the inner housing 14 as shown in FIG. 7B.

Figure 9:
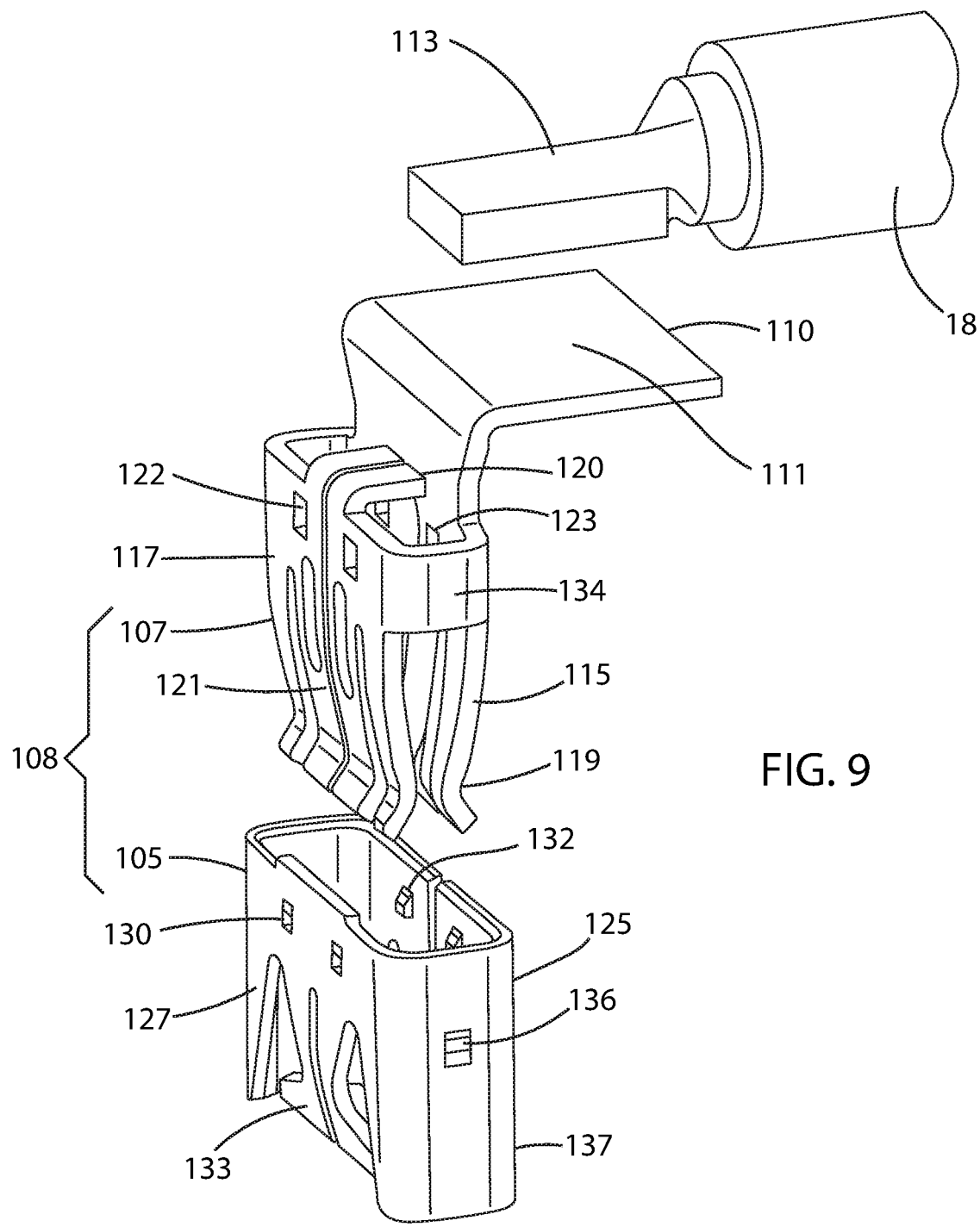
FIG. 9 shows an exploded perspective view of a cable reinforcement retainer assembly, the cable reinforcement retainer assembly having a clamp (or retainer) mounted onto and surrounding an end terminal.

FIG. 9 shows an exploded perspective view of the cable reinforcement retainer assembly 108 (also referred to as reference number 16 in FIG. 1), each cable reinforcement retainer assembly 108 having a clamp (or retainer) 105 mounted onto and surrounding a preferably flexible (although not limited thereto) end terminal 107. The end terminal 107 has a substantially flat and substantially bent end portion 110, which attaches to a cable terminal 113 attached to a cable 18. The terminal 107 includes a first side portion 115 and a second side portion 117. The first side portion 115 includes a plurality of preferably flexible fingers 119, and the second side portion 117 also includes a plurality of preferably flexible fingers 121. Although not limited thereto, the flexible fingers 119 and the flexible fingers 121 are substantially symmetrical. Attached to the second side portion 117 is at least an extending member 120 that extends towards the first side portion 115. Each of the first side portion 115 and the second side portion 117 of the end terminal 107 includes at least an indentation or aperture 122, 123, respectively.

The clamp (or retainer) 105 of the cable reinforcement retainer assembly 108 includes a first side portion 125 and a second side portion 127. Each of the first side portion 125 and the second side portion 127 of the clamp 105 includes at least an inwardly protruding member 130, 132, respectively. The protruding members 130, 132 enter the indentations or apertures 122, 123, respectively, when the end terminal 107 is accommodated within the clamp 105 during assembly thereof. Further shown in FIG. 9 is at least a flexible member 133 in the second side portion 127 of the clamp 105. Although the flexible member 133 is shown in FIG. 9 as a pair of flexible members 133, it is not limited thereto.

At least a side portion 134 of the terminal 107 is prevented from traversing pass at least an inwardly protruding member 136 located at a side 137 of the clamp 105. It is preferred that each of the opposing sides 137 of the clamp 105 includes an inwardly protruding member 136, and that the end terminal 107 includes opposing sides 134.

Figure 10:
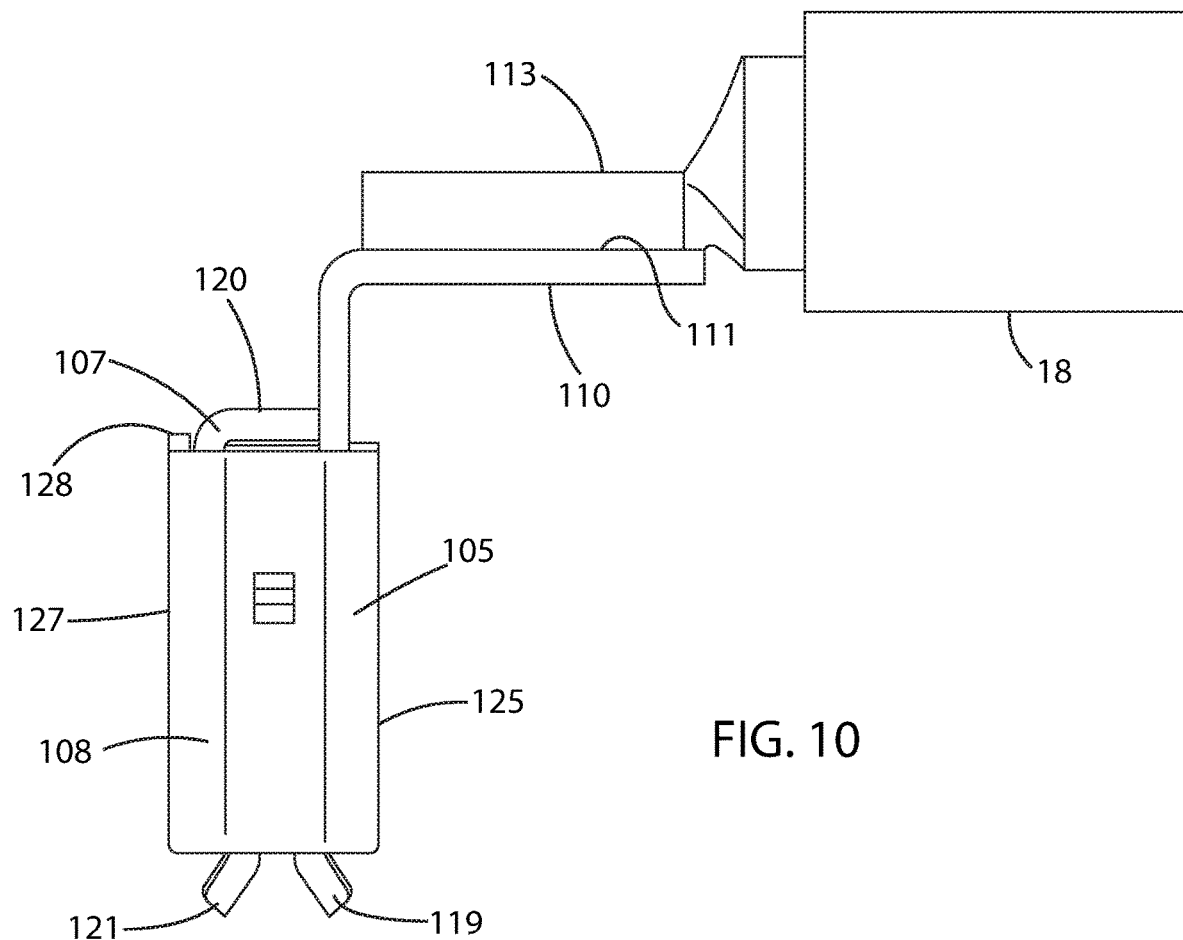
FIG. 10 illustrates a side elevational view of the cable retainer assembly as being fully assembled and an end portion of the end terminal of the clamp being coupled to a terminal of a cable.

The cable reinforcement retainer assembly 108 is shown in FIG. 10 as being fully assembled and the end portion 110 of the end terminal 107 of the clamp 105 being coupled to the terminal 113 of the cable 18. The cable reinforcement retainer assembly 108, as illustrated in FIG. 10, shows the end portion of at least one of the flexible members 121 of the second side portion 117 of the end terminal 107, and an end portion of at least one of the flexible members 119 of the first side portion 115 of the end terminal 107. See, also, FIG. 9.

Figure 11A:
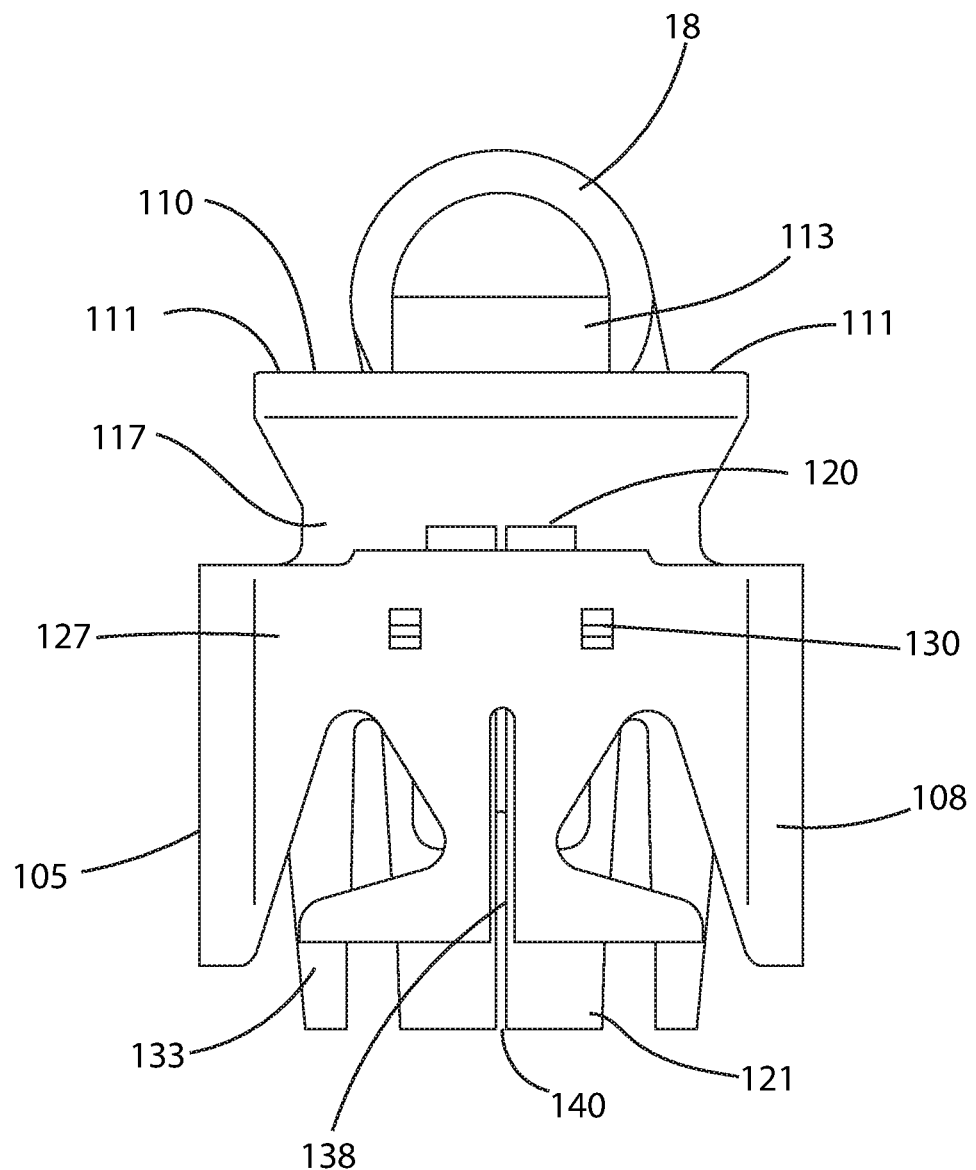

FIG. 11A is an elevational view of the second side portion 117 of the end terminal 107 and the second side portion 127 of the clamp 105 of the cable reinforcement retainer assembly 108. The second side portion 127 of the clamp 105 includes at least a flexible member 133. Although not limited thereto, shown in FIG. 11A, is a pair of flexible members 133 with an elongated slit 138 therebetween. Also shown in FIG. 11A are the inwardly protruding members 130 in the second side portion 127 of the clamp 105, which are preferably inclined for easy entry into the indentations or apertures 122 of the end terminal 107 (see, FIG. 9) when the end terminal 107 is moved inside the clamp 105. Once the inwardly protruding members 130 have been accommodated within the indentations or apertures 122, the end terminal 107 is held inside the clamp 105. That is, the inwardly protruding members 130, 132 of the clamp 105 are preferably inclined for allowing the terminal 107 to be inserted into the clamp 105; and once the inwardly protruding members 130, 132 have been respectively accommodated within the indentations or apertures 122, 123 of the end terminal 107, the terminal 107 is prevented from being pulled out from the clamp 105. As described earlier with respect to FIG. 9, the opposing sides 134 of the end terminal 107 are held by the inwardly protruding members 136 of the clamp 105, and prevents the retainer 107 from being pushed further forward into the clamp 105. When thus assembled, the cable retainer assembly 108, as illustrated in FIGS. 10, 11A, and 11B, has the ends of the flexible members 119, 121 of the terminal 107 extending outside of the clamp 105.

Figure 11B:
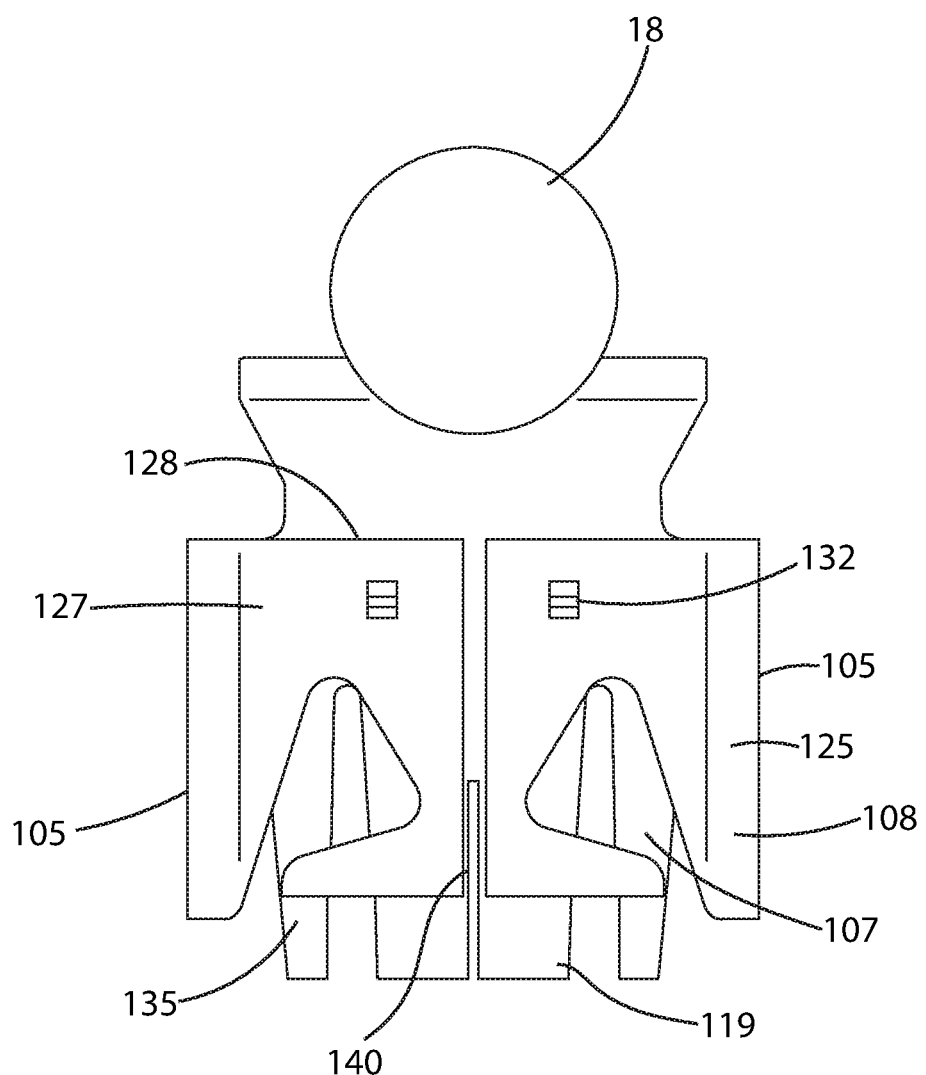
FIG. 11B is an elevational view of a second side portion of the end terminal and a second side portion of the clamp of the cable retainer assembly.

Illustrated in FIG. 11B is an elevational view of the cable retainer assembly 108 showing the first side portion 115 of the end terminal 107 and the first side portion 125 of the clamp 105. Illustrated here are the inwardly protruding members 132 and the pair of flexible members 135 of the clamp 105, and the ends of the flexible members 119 of the first side portion 115 of the terminal 107 extending outside of the clamp 105 when the cable reinforcement retainer assembly 108 is assembled as shown.

Further shown in FIG. 11B is an elongated slit 140 (shown here as passing in its entirety through the first side portion 125 of the clamp 105 between the pair of flexible members 135.

Figure 12A:
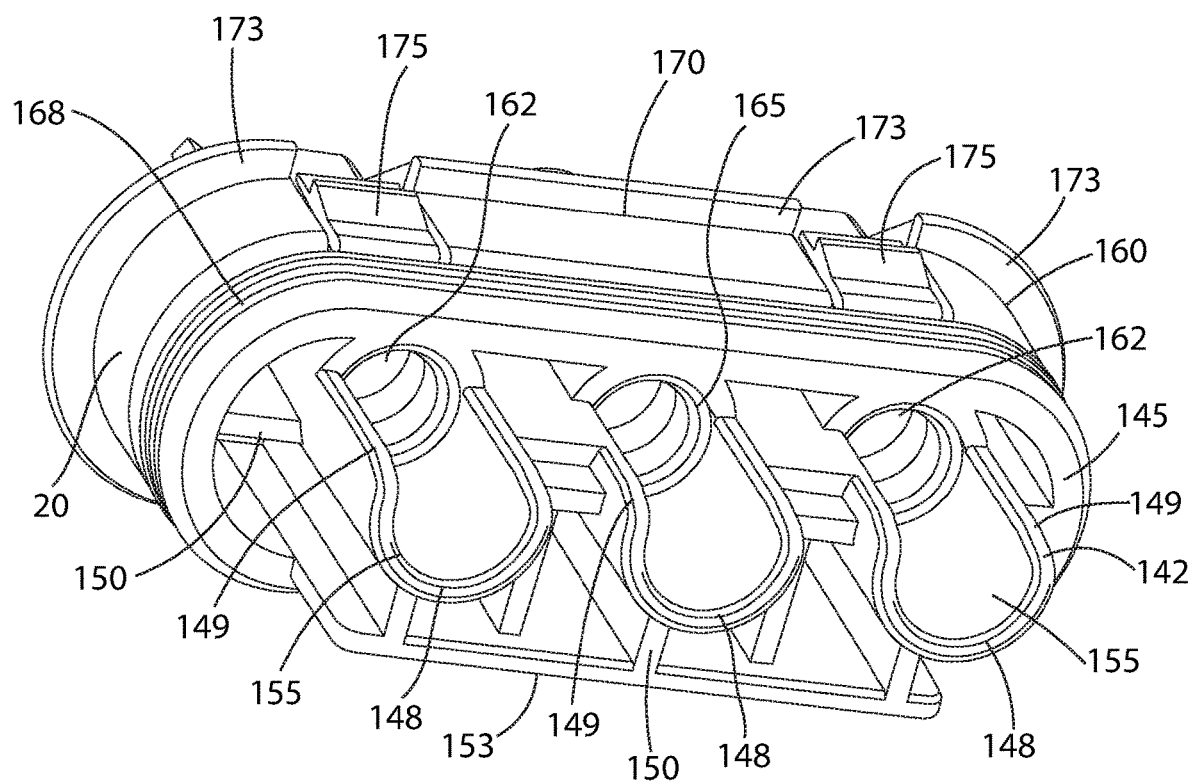

FIG. 12A illustrates a perspective view of a bottom portion 142 and a back portion 145 of the back cover 20. Shown here is at least a substantially half-circular tubular member 148 having a bottom portion 149 and extending from the back portion 145 of the back cover 20. For strength and stability, the half-circular tubular members 148 are joined to bridge (or rib) members 150 respectively connected to the back cover 20 and extending to the sides 153 of the back cover 20. Openings 155 of the tubular members 148 extend toward a middle portion 160 of the back cover 20. Inside the middle portion 160 are substantially circular apertures 162, which respectively communicate with the tubular members 148. Inside each of the circular apertures 162 is a circular fitting silicone seal 165; and on the outer periphery of the middle portion 160 of the back cover 20 is an over-molded silicone seal 168. The back cover 20 has the circular fitting silicone seal 165 for interface with the cable 18 and the over-molded silicone seal 168 for interface with the inner surface of the outer housing 5. With the cables 18 being respectively accommodated within the circular fitting silicone seals 165, the back cover 20 acts as a terminal position assurance (TPA) device for the high voltage connector 1 of this invention. Surrounding a lower portion 170 of the back cover 20 are ledges 173; and between the ledges 173 are inclined protruding members 175, as shown in FIG. 12A.

Figure 12B:
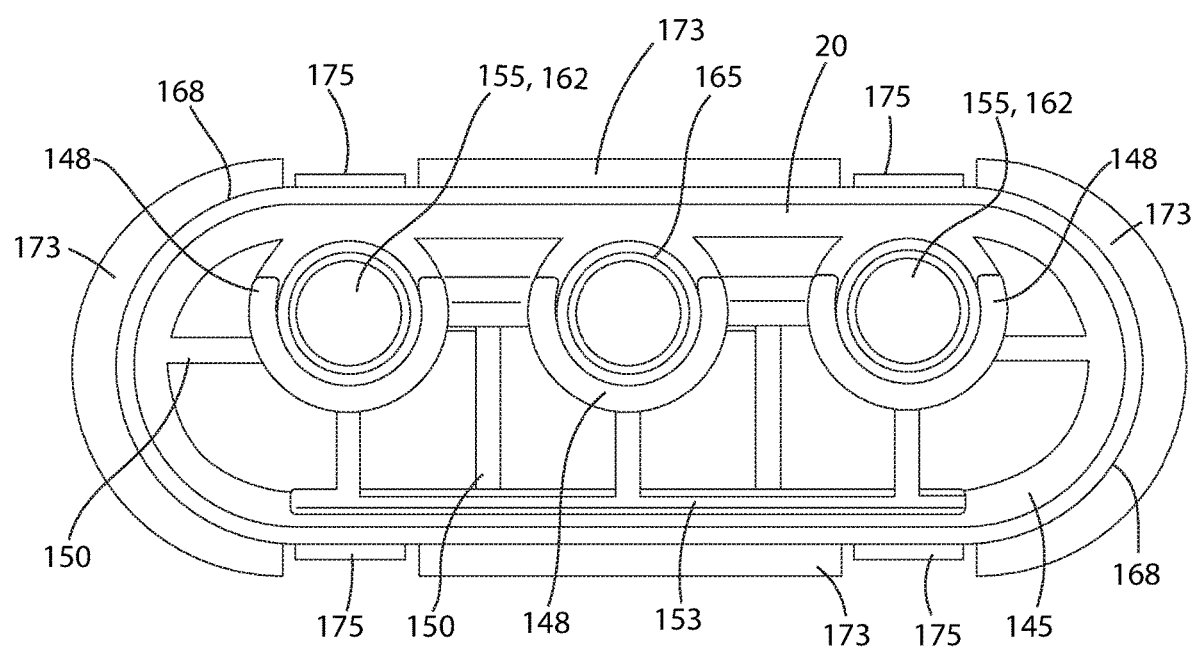
FIG. 12B illustrates an elevational view of the back portion of the back cover.

The above-described elements of the back cover 20, as shown in FIG. 12A, are similarly shown in the elevational view of the back portion 145 of the back cover 10 illustrated in FIG. 12B. Shown here are the tubular members 148, and bridge (rib) members 150 connected to the sides 153. Also shown in FIG. 12B are the respective openings 155 of the tubular members 148, which communicate with the circular apertures 162 thereof, the respective circular fitting silicone seals 165 being fitted inside the circular apertures 162, and the silicone seal 168 surrounding the outer periphery of the middle portion 160 of the back cover 20. Shown in FIG. 12B are the ledges 173 surrounding, on all sides, the lower portion 170 (see, FIG. 12A) of the back cover 20, and the inclined protruding members 175 extending on opposing sides of the back cover 20, as shown in FIG. 12B.

Figure 13A:
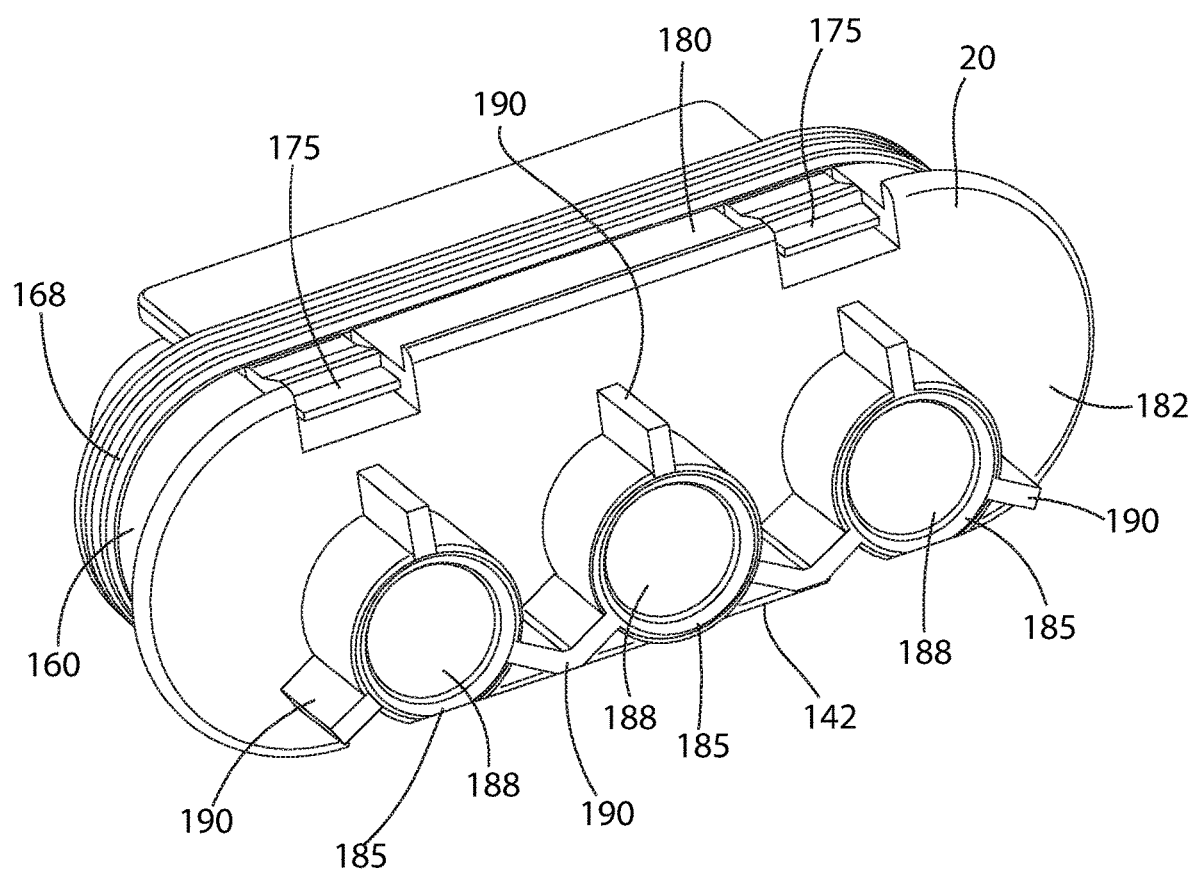

FIG. 13A is a perspective view of a top portion 180 and a front portion 182 of the back cover 20. Shown on the top portion 180 are the inclined protruding members 175. Opposite the top portion 180 of the back cover 20 is the bottom portion 142 thereof. Extending from the front portion 182 are top tubular members 185 with respective openings 188 that respectively communicate with the circular apertures 162 extending through the middle portion 160 of the back cover. As in the half-circular tubular members 148 extending from the back portion 145, the top tubular members 185 are similarly surrounded by bridge (or rib) members 190. Surrounding the outer periphery of the middle portion 160 is the silicone seal 168.

Figure 13B:
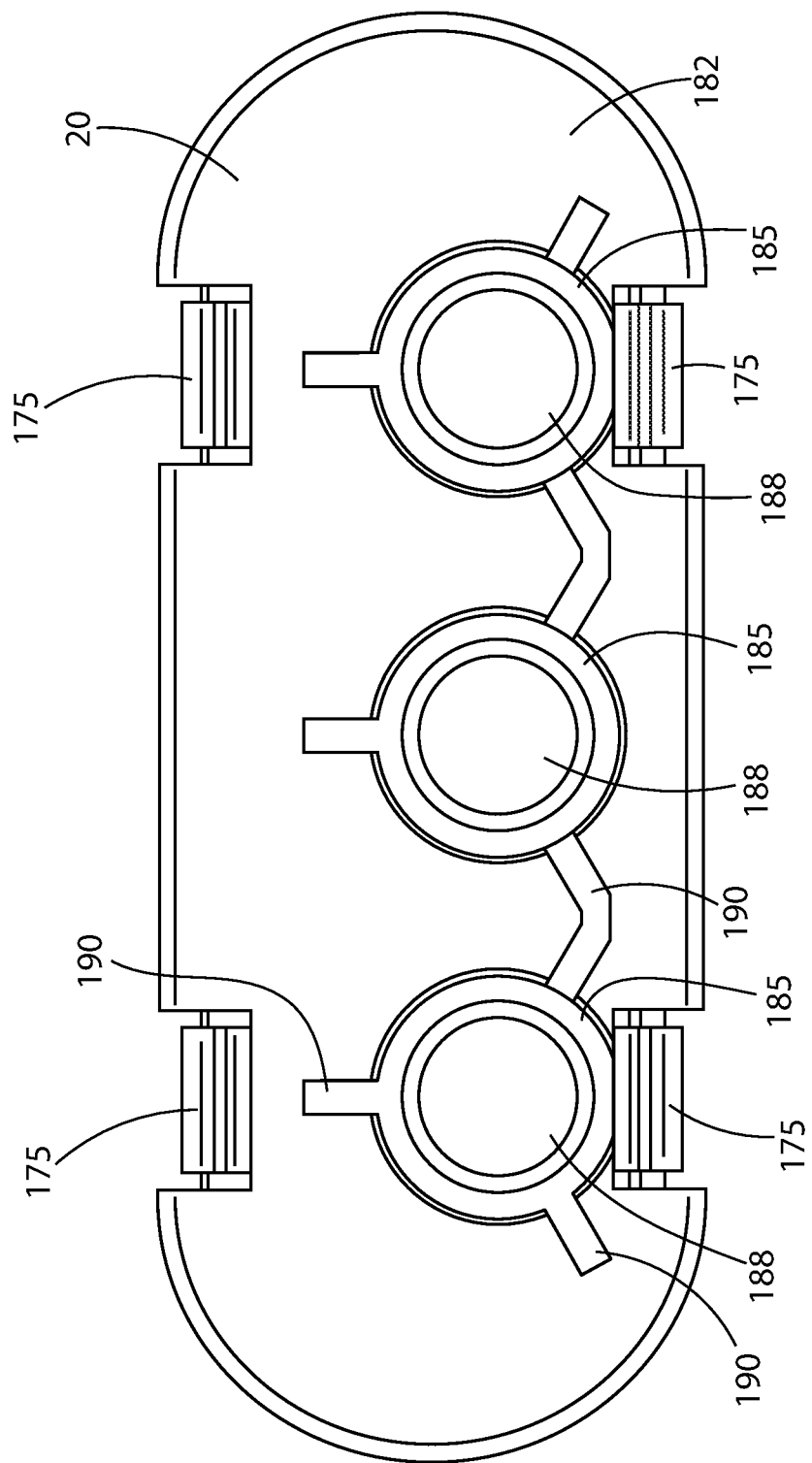
FIG. 13B is an elevational view of the front portion of the back cover.

FIG. 13B is an elevational view of the front portion 182 of the back cover 20 showing the respective openings 188 of the top tubular members 185 and the associated bridge (or rib) members 190. Also shown in FIG. 13B are the respective circular fitting silicone seals 165, discussed earlier with respect to FIG. 13A, and the inclined protruding members 175 located in the front portion 182 at opposing sides thereof.

Figure 14A:
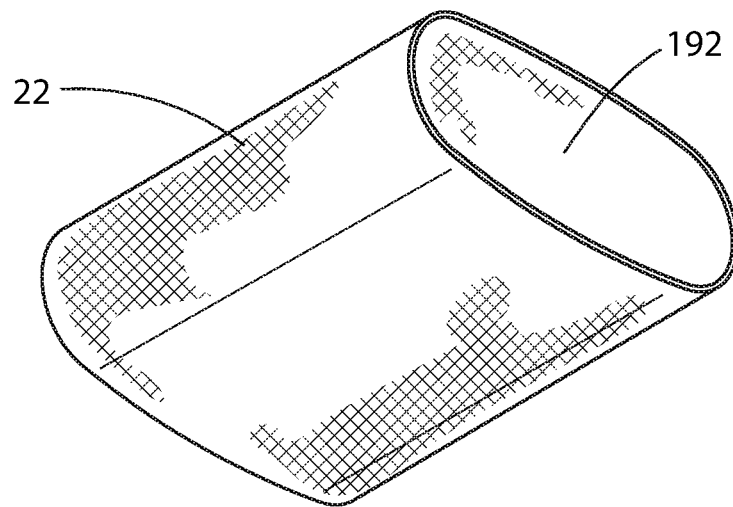
FIG. 14A is a perspective view of the braided shield.
Figure 14B:
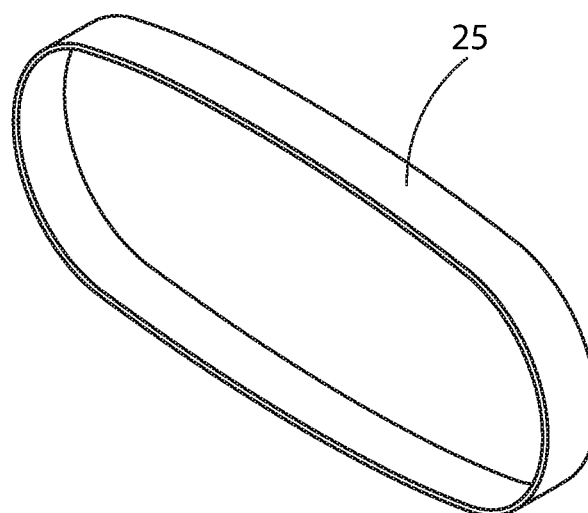
FIG. 14B is a perspective view of the metallic clamp.

FIG. 14A is a perspective view of the braided shield 22 having an internal opening 192 extending along the entire length thereof. The braided shield 22 is made of metal, preferably stainless steel or the like. FIG. 14B is a perspective view of the metallic clamp 25, which is substantially ring-like in shape and is made of stainless steel or the like.

In the high voltage horizontal connector 1 of this invention, the ground system is provided with the connection of the connector 1 to the associated aluminum device 210 by establishing contacts among the metal-infused conductive plastic outer housing 5, the aluminum compression limiters 28, the stainless steel bolts 12, and the associated aluminum device 210. The substantial reduction or elimination of EMI is provided by the metal-infused pads 48 of the outer housing 5 in conjunction with the braided shield 22 extending along the paths of the cables 18, the metal-infused pads 48 contacting the associated aluminum device 210. This invention further provides a galvanic corrosion prevention with the base 52 of the non-conducting over-molded silicone seal 7 shielding the metal-infused conductive plastic outer housing 5 and the associated aluminum device 210 from electrolytic fluid to prevent galvanic corrosion. Galvanic corrosion is further prevented with the side members 57 of the upper portion 55 of the silicone seal 7 shielding the metal-infused conductive plastic outer housing 5 and the aluminum compression limiters 28, and further shielding the stainless bolts 12 and the associated aluminum device 210 from electrolytic fluid to prevent galvanic corrosion.

The method for assembling the high voltage connector of this invention is hereinafter described in detail. The bolts 12 are respectively secured into the compression limiters 28, which are inside the side apertures 38 of the outer housing 5, thereafter mounting the outer housing 5, along with the outer-molded silicone seal 7, onto the device 210 (see, FIG. 15) onto which the outer housing 5 and subsequently the connector 1 is to be mounted. The bolts 12 securely fasten the connector 1 to the device 210, and provides grounding among the braided shield 22, the outer housing 5, and the device 210. Preferably, the stainless steel bolts 12 and the aluminum compression limiters 28 provide the contact between the connector 1 and the device 210 to ground the system.

With the outer housing 5, along with the outer-molded silicone seal 7, having been mounted onto the device, the inner housing 14 is then inserted or slid into the central opening 40 of the outer housing 5 until the inner housing 14 is about to reach or reaches the end portion 45 (see, FIG. 6) of the outer housing 5, and the inner housing 14 is then inserted or slid downward into the bottom opening or aperture 50 (see, FIG. 6) of the outer housing 5 so as to mount the inner housing 14 onto the base 32 of the outer housing 5 until a clicking sound or the like is heard, which assures that the inner housing 14 is secured inside the outer housing 5. The over-molded silicone seal 7 provides a sealing and insulation layer for galvanic corrosion protection between the connector 1 and the device 210. Preferably, a plurality of pre-assembled cable reinforcement retainer assemblies 108 with their respective cables 18 is first inserted into the central opening 40 of the outer housing 5 and then inserted downward into the inner housing 14 until a clicking sound or the like is heard in which case the back cover 20 then slides along the cables 18 through the central opening 40 and into the outer housing 5 until a clicking sound or the like is again heard once the back cover 20 is secured inside the outer housing 5. At such time, the partially assembled connector 1 is as shown in FIG. 2A. Thereafter, the braided shield 22 is mounted onto the outer housing 5, and the clamp 25 is slid down over the braided shield 22 towards the back end portion of the braided shield 22 and rests thereonto (see, FIG. 2B) and provides the conductive contact between the braided shield 22 and the outer housing 5.

More particularly, when the inner housing 14 is inserted into the central opening 40 of the outer housing 5, the inner housing 14 is about to reach or reaches the end portion 45 of the outer housing 5 and is then inserted into the opening or aperture 50 and lowered towards the base 32 of the outer housing 5, the downwardly extending member 83 of the inner housing 14 enters (or slides) downwards into the bottom opening or aperture 50 of the outer housing 5. Then, the bottom surface 92 of the front extending member 87 of the inner housing 14 mounts onto an inner side portion 41 (see, FIGS. 3A and 6) of the outer housing 5. Substantially thereupon, the upper portion 201 of the flexible latch member 200 (see, FIG. 8) on opposing sides of the inner housing 14 respectively enter indentations 99 (see, FIG. 6) on opposing inner sides of the outer housing 5 at which time, a clicking sound or the like is heard. The clicking sound or the like thus indicates that the inner housing 14 is securely mounted inside the outer housing 5. The inner housing 14 (preferably made of nylon or the like) provides separation between conductive parts (e.g., the outer housing 5 made of metal-infused plastic or the like and the cable terminals 107 secured inside the inner housing 14).

Thereafter, preferably a plurality of pre-assembled cable reinforcement retainer assemblies 108 (see, FIG. 10) with their accompanying respective cables 18 have their accompanying cables 18 inserted inside the respective circular fitting silicone seals 165 of the respective circular apertures 162 of the back cover 20.

The preferably pre-assembled cable reinforcement retainer assemblies 108 are then inserted or slid into the central opening 40 of the outer housing 5 and lowered towards the upper slots 188, 189, 190 (see, FIG. 8) of the inner housing 14. More particularly, with the second side portions 125 of the clamps 105 respectively facing the front portion 70 of the inner housing 14, the cable reinforcement retainer assemblies 108 are inserted or slid substantially horizontally through the central opening 40 of the outer housing 5 and subsequently lowered respectively through the upper slots 188, 189, 190, but do not pass beyond the slots 88, 89, 90 of the bottom end portions 85 of the inner housing 14 (see, FIG. 7B). The cable reinforcement retainer assemblies 108 respectively travel downward through the upper slots 188, 189, 190 of the inner housing 14 and the clamps 105 respectively push, while traveling downward, the inclined ledges 103 of the flexible members 75, 76, 77 (see, FIG. 8) of the inner housing 14 until each upper end 128 (see, FIG. 10) of each clamp 105 respectively settles beneath one of the inclined ledge 103 of the inner housing 14 (see, FIG. 8); thereupon, a clicking sound or the like is heard, which indicates that the clamps 105 and consequently the cable reinforcement retainer assemblies 108 are securely fastened within the inner housing 14. At this time, the substantially flat and substantially bent portion 110 (see, FIG. 10) of the end terminal 107 sits or is mounted onto the substantially flat and substantially horizontal first portion 80 of the front extending member 87 of the inner housing 14. The second portions 82 of the front extending member 87 of the inner housing 14 respectively separating the substantially flat and substantially bent portions 110 of the end terminals 107.

Thereafter, the back cover 20 is slid substantially horizontally, along the cables 18, towards the outer housing 5 and through the central opening 40 thereof until the inclined protruding members 175 (see, FIGS. 13A and 13B) at opposing sides of the back cover 20 respectively enter the apertures 42 (see, FIGS. 3A and 3B) passing through the front portion of the outer housing 5 at which time a clicking sound or the like is heard to indicate that the back cover 20 has been securely fastened to the outer housing 5 with the cable reinforcement retainer assemblies 108 similarly fully secured inside the outer housing 5. That is, the back cover 20 pushes the inner housing 14 in place and ensures that the inner housing 14 is properly positioned in the outer housing 5.

Figure 15:
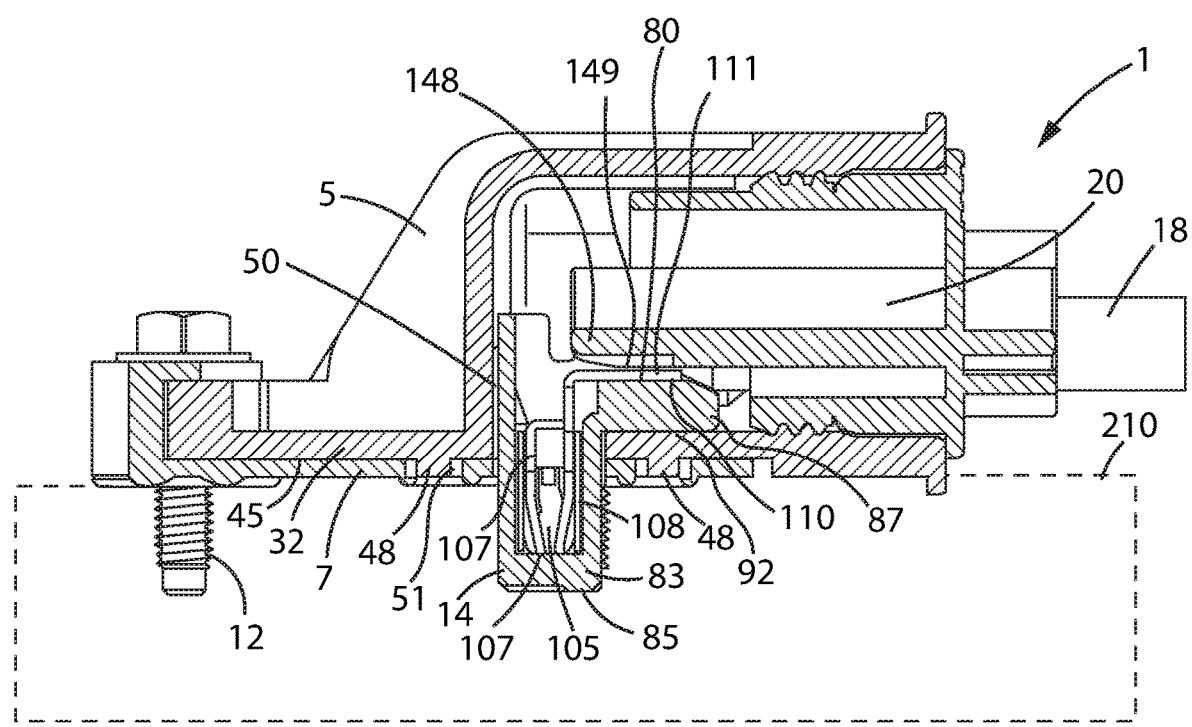
FIG. 15 is the fully assembled horizontal high voltage connector of this invention showing a wedge (or impinging) mechanism for securing the cables in the inner housing contained within the outer housing.

As illustrated in FIG. 15, the horizontal high voltage connector 1 of this invention is mounted onto a device 210 (e.g., an inverter or the like) with the use of the bolts 12. The downwardly extending member 83 of the inner housing 14 is shown as having passed through the bottom opening or aperture 50 of the bottom end portion 45 of the base 32 of the outer housing 5 and through the over-molded silicone seal 7. The pads 48 of the bottom end portion 45 of the base 32 of the outer housing 5 are shown as being inside the elongated slots 51 of the over-molded silicone seal 7.

As further illustrated in FIG. 15, the substantially flat and substantially bent portion 110 (see, FIG. 10) of the end terminal 107 of the cable reinforcement retainer assembly 108 sits or is mounted onto the substantially flat and substantially horizontal first portion 80 of the front extending member 87 of the inner housing 14. The bottom surface 92 of the front extending member 87 of the inner housing 14 is seated or mounted onto an inner side portion 41 (see, FIGS. 3B and 6) of the outer housing 5.

Figure 16:
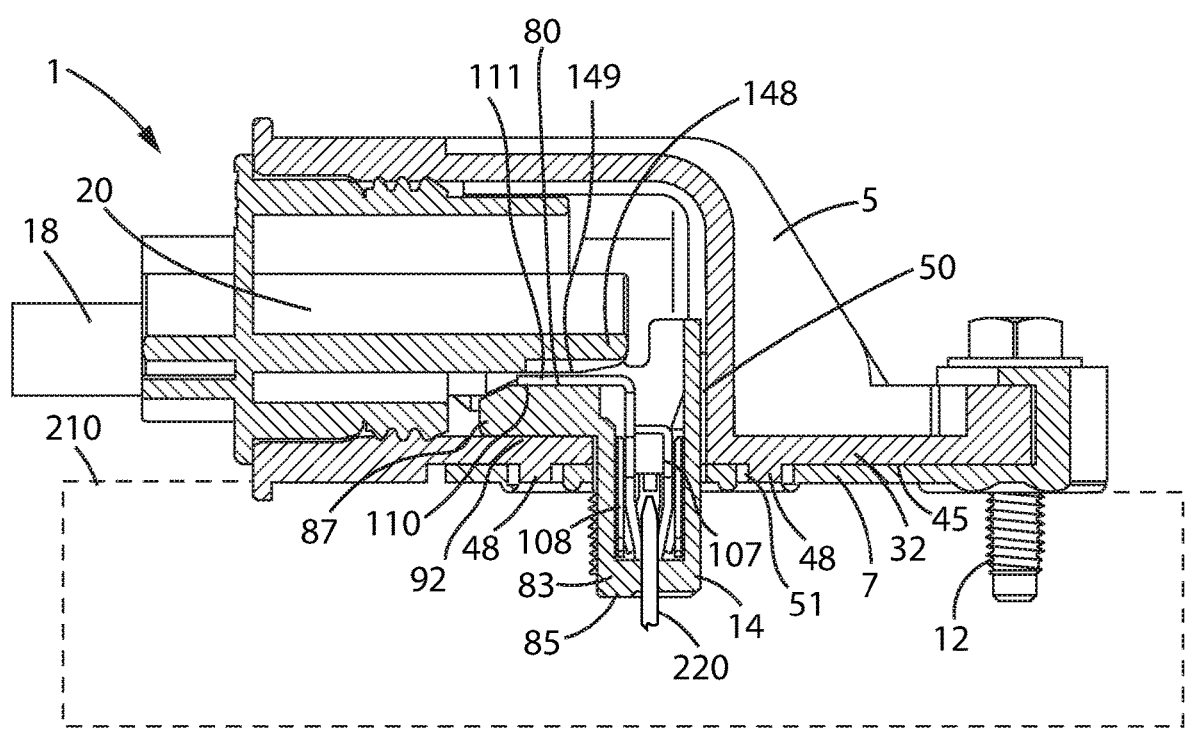
FIG. 16 is the fully assembled horizontal high voltage connector of this invention showing the wedge (or impinging) mechanism for securing the cables in the inner housing contained within the outer housing, and further showing a terminal extending from a corresponding device, onto which the connector is mounted, to connect with an end terminal of the cable reinforcement retainer assembly.

Also illustrated in FIG. 15 is the wedge or impinging mechanism A for securing the cables 18 in the inner housing 14. More particularly, when the back cover 20 is inserted or slid substantially horizontally, along the cables 18, through the central opening 40 and into the outer housing 5, the bottom portions 149 of the substantially half-circular tubular members 148 (see, FIG. 12A) of the back cover 20 respectively wedge or impinge against top face portions 111 (see, FIGS. 10 and 11A) of the end portions 110 of the end terminals 107 of the cable reinforcement retainer assemblies 108, thereby securing the cables 18 inside the inner housing 14. As shown in FIG. 16, the ends of the flexible members 119, 121 of the terminal 107 (see, e.g., FIG. 10), which extend to the outside of the clamp 105, connect with a set of terminals 220 of the associated device 210.

Thereafter, to shield the exposed cables 18, the braided shield 22 is slid substantially horizontally towards the outer housing assembly 3 whereby a back portion of the braided shield 22 passes the outer ledges 98a, 98b (see, FIG. 6), extend from a portion of the outer housing 3 near its central opening 40. The clamp 25 is then slid substantially horizontally along the braided shield 22 pass the outer ledges 98a, 98b, and at about pass the outer ledges 98a, 98b, the clamp 25 connects the braided shield 22 to the outer housing 5 and assures the connection thereof.

When fully-assembled, the horizontal high voltage connector 1 of this invention includes a ground system that is provided with the connection of the connector 1 to the associated aluminum device 210 by establishing contacts among the metal-infused conductive plastic outer housing 5, the aluminum compression limiters 28, the stainless steel bolts 12, and the associated aluminum device 210. The substantial reduction or substantial elimination of EMI is provided by the shielding of the EMI by the braided shield 22 extending along the paths of the cables 18, or the diversion of the EMI from the braided shield 22 to the metal-infused pads 48, which are used for EMI grounding, contacting the associated aluminum device 210. That is, the EMI is diverted to a path from the stainless steel braided shield 22, which is connected to the metal-infused plastic outer housing 5 by the stainless steel clamp 25, to the metal-infused plastic outer housing 5 mounted onto the, for example, aluminum inverter 210. This invention further provides a galvanic corrosion prevention with the base 52 of the non-conducting over-molded silicone seal 7 shielding the metal-infused conductive plastic outer housing 5 and the associated aluminum inverter 210 from electrolytic fluid to prevent galvanic corrosion. The metal-infused pads 48 protruding through and bordered by the silicone seal 7 prevents galvanic corrosion between the metal-infused outer housing 5 and the aluminum inverter 210. Galvanic corrosion is further prevented with the side members 57 of the upper portion 55 of the silicone seal 7 shielding the metal-infused conductive plastic outer housing 5 and the aluminum compression limiters 28, and further shielding the stainless bolts 12 and the associated aluminum inverter 210 from electrolytic fluid to prevent galvanic corrosion.

Figure 17:
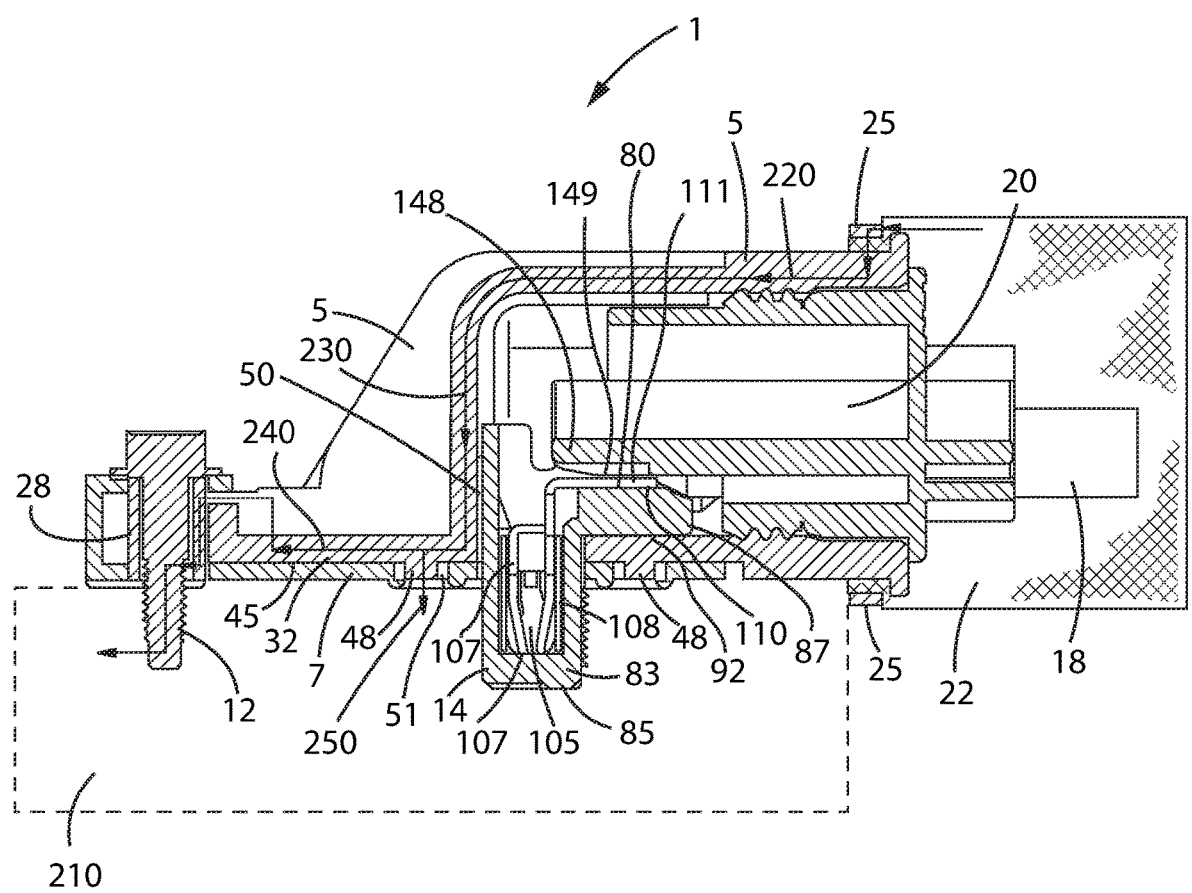
FIG. 17 is the fully assembled multi-directional, angled, or horizontal high voltage connector of this invention showing an electrical grounding path of the EMI noise generated by a source, which is then conducted through the metallic braided shield, flowing through the connector assembly, and conducted ultimately to the corresponding metallic device onto which the connector assembly is mounted.
Figure 18:
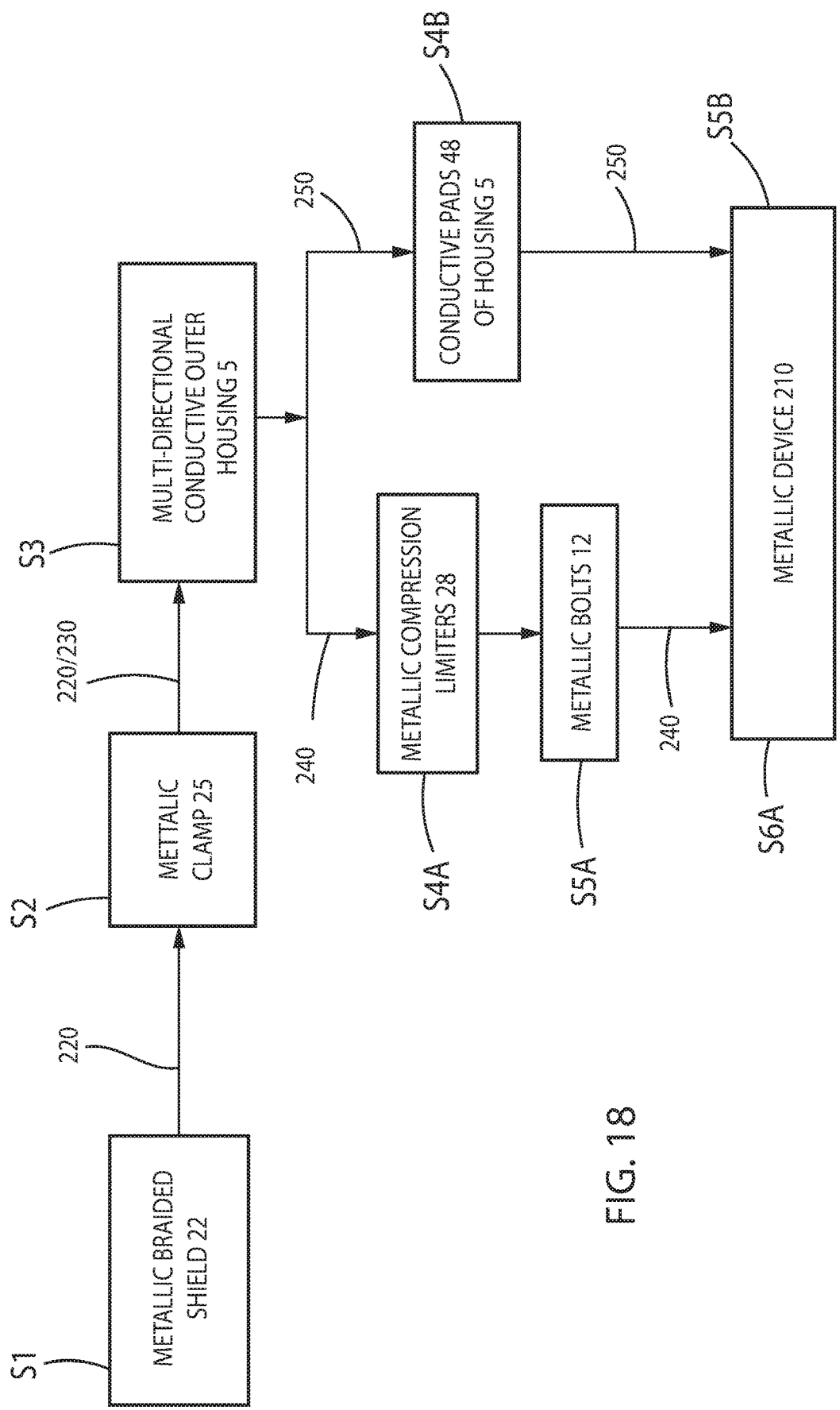
FIG. 18 is a flowchart of the electrical grounding path of the EMI noise that flows through the metallic braided shield, flowing through the multi-directional, angled, or horizontal connector assembly, and conducted ultimately to the corresponding metallic device onto which the connector assembly is mounted.

FIG. 17 is the fully assembled vertical high voltage connector assembly 1 of this invention showing electrical grounding paths 220, 230, 240, 250 of the EMI noise generated by a source (e.g., the conducting high voltage cables 18, the conducting cable reinforcement retainer assemblies 16, 108, the battery itself, or the like, or any other source), which is then conducted through the metallic braided shield 22, flowing through the high voltage connector 1, and conducted ultimately to the corresponding metallic device 210 onto which the high voltage connector 1 is mounted. FIG. 18 is a corresponding flowchart of the electrical grounding paths 220, 230, 240, 250 of the EMI noise that flows through the metallic braided shield 22, flowing through the high voltage connector 1, and conducted ultimately to the corresponding metallic device 210 onto which the high voltage connector 1 is mounted.

More particularly, in, for example, an electric vehicle or a hybrid vehicle, when the EMI noise is generated by, for example, the vehicle high voltage battery, the conducting cables 18 connected to the battery, the cable reinforcement assemblies 16, 108, or the like, or any other source, the EMI noise, for reasons discussed earlier, needs to be reduced, suppressed, or eliminated. The electrical grounding EMI noise flow paths 220, 230, 240, 250 are illustrated in FIG. 17. As shown in FIG. 17, the EMI noise flow path 220 initially flows through the metallic braided shield 22 (made of stainless steel or the like). The EMI noise flow path 220 then flows through the metallic clamp 25, which (as discussed earlier) secures the metallic braided shield 22 to the multi-directional conductive outer housing 5. The outer housing 5 is made of a metal-infused conductive plastic, resin, nylon, or the like. The outer housing 5 may also be made of a stainless steel fiber-filled plastic, resin, nylon, or the like. The EMI noise flow path 220 is then directed to the EMI noise flow path 230 along an angled or multi-directional portion of the conductive outer housing 5, which travels through a different direction from the EMI noise flow path 220. In this case, in view of the angled or multi-directional configuration of the outer housing 5, the EMI flow path, which similarly travels along the conductive outer housing 5, is orthogonal to the direction through which the EMI noise flow path 220 travels. The EMI noise flow path 230 continues its travel through the EMI noise flow path 240, and is then conducted to at least one of the metallic compression limiters 28 (made of aluminum or the like) that surrounds a corresponding bolt (made of stainless steel or the like).

From the conductive outer housing 5, the EMI noise flow path 240 flows to the metallic compression limiter 28 (made of aluminum or the like) (see EMI noise flow path 240 in FIG. 17), the metallic compression limiter 28 surrounding a corresponding bolt 12 (made of stainless steel or the like), the bolt 12 connecting the connector assembly 1 to the metallic device 210 onto which the connector assembly 1 is mounted. With the above-discussed structural arrangements, the EMI noise flow path 240 thereby travels from the conductive outer housing 5 to the metallic compression limiter 28 to the surrounding corresponding stainless steel bolt 12, and is ultimately conducted to the associated metallic device 210. The associated metallic device 210 may be, e.g., an aluminum automotive transmission.

Moreover, as discussed above, FIG. 5A illustrates the bottom end portion 45 of the outer housing assembly 3 with the pads 48 of the outer housing 5 passing through the elongated slits 51 of the silicone seal 7 when the outer housing 5 sits and mounts onto the over-molded silicone seal 7. FIG. 5B illustrates the bottom end portion 45 of the outer housing assembly 3 with the pads 48 of a different embodiment or pattern passing through corresponding elongated slits 51 of a different embodiment or pattern of the silicone seal 7 when the outer housing 5 sits and mounts onto the over-molded silicone seal 7.

The pads 48 of the conductive outer housing 5, which pass through the elongated slits 51 of the silicone seal 7, contact the corresponding metallic device 210. Preferably, the tightening of the bolts 12 in connecting the connector assembly 1 to the corresponding metallic device 210 ensures that physical contact is maintained between the pads 48 of the conductive outer housing 5 and the corresponding metallic device 210, although the tightening of the bolts 12 is limited by the compression limiters 28 to ensure that the physical or functional integrity of the silicone seal 7 is maintained.

With the above-described assurance of the physical contact of the pads 48 of the conductive outer housing 5 to the corresponding metallic device 210, the EMI noise flow path 220 flows from the metallic braided shield 22 to the multi-directional conductive outer housing 5 following the EMI noise flow path 230 along an angled or orthogonally directed part of the multi-directional conductive outer housing 5 directly to the corresponding metallic device 210 (see, EMI noise flow path 250).

Although only a single metallic compression limiter 28 and a single corresponding stainless steel bolt 12 are described above, the EMI noise flow path 240 can travel to the plurality of metallic compression limiters 28 and to the corresponding stainless steel bolts 12 shown in FIGS. 2A and 2B. Also, the EMI noise flow path 250 can travel through the plurality of pads 48 of the conductive outer housing 5 of differing embodiments or patterns passing through corresponding elongated slits 51 of differing embodiments or patterns of the silicone seal 7, as discussed above with respect to FIGS. 5A and 5B.

As further discussed above, the noise flow path 220 of the generated EMI noise flows from the metallic braided shield 22 and ultimately to the corresponding metallic device 210 as follows: (1) from the metallic braided shield 22 to the multi-directional conductive outer housing 5 through the metallic compression limiters 28 and through their respective bolts 12 and ultimately to the corresponding metallic device 210 (see, the EMI noise flow paths 220, 230, 240), and (2) from the metallic braided shield 22 to the multi-directional conductive outer housing 5 through the conductive pads 48 thereof and ultimately to the corresponding metallic device 210 (see, EMI noise flow paths 220, 230, 250).

Although FIG. 17 shows an angled or orthogonally directed part of the conductive outer housing 5 through which the EMI noise flow path 230 is directed, multi-directional parts of the conductive outer housing 5 are surely envisioned by the inventor and is, alternatively, paths through which the EMI noise flow paths 220, 230, 240, 240 may be directed.

FIG. 18 further illustrates the EMI noise flow paths 220, 230, 240, 250 flowing from the metallic braided shield 22 and ultimately to the corresponding metallic device 210.

The EMI noise is, as discussed above, generated by a source (e.g., a battery of an electric vehicle, a hybrid vehicle, or the like, or conducting cables 18, or conducting cable reinforcement retainer assemblies 16, 108, or the like), and the method for protecting the connector assembly 1 from the EMI grounding noise is shown in the flowchart of FIG. 18. As shown in Step 1 (S1), the EMI noise is conducted through the metallic braided shield 22. In Step 2 (S2), the EMI noise continues its flow through noise flow path 220 to the metallic clamp 25, and continues further through the EMI noise flow path 220 to the multi-directional conductive outer housing 5 through an angled part or multi-directional part of the conductive outer housing 5 in EMI noise flow path 230 in Step 3 (S3).

In the EMI noise flow paths 230, 240, the EMI noise is conducted, in Step 4A (S4A), from the angled part or the multi-directional part of the conductive outer housing 5 to the metallic compression limiters 28 continuing through the EMI noise flow path 240 to the corresponding bolts 12 in Step 5A (S5A), and conducted ultimately in Step 6A (S6A) to the metallic device 210 onto which the connector assembly 1 is mounted.

In the EMI noise flow paths 230, 250, the EMI noise is conducted, in Step 4B (S4B), from the angled part or the multi-directional part of the conductive outer housing 5 directly through the conductive pads 48 of the conductive outer housing 5 and conducted ultimately to the corresponding metallic device 210 in Step 5B (S5B) onto which the connector assembly 1 is mounted.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

I claim:

1. An electromagnetic interference (EMI) grounding protection method for a connector assembly using a multi-directional conductive housing, comprising the steps of:

conducting said EMI generated by a source toward a metallic braided shield, said metallic braided shield being secured and mounted onto said conductive housing by a metallic clamp;

conducting said EMI from said metallic braided shield to said metallic clamp and to said multi-directional conductive housing, said conductive housing having angled parts or multi-directional parts, and said multi-directional conductive housing being mounted to a metallic device by at least a bolt and said bolt being accommodated within a corresponding metallic compression limiter; and thereafter conducting said EMI from said multi-directional conductive housing to said corresponding metallic compression limiter and to said bolt within said corresponding metallic compression limiter, and ultimately, to said metallic device resulting in EMI protection of said connector assembly by grounding said EMI, said bolt having a head that mounts onto said corresponding metallic limiter and a seal, and said seal receiving a bottom portion of said multi-directional conducting housing.

2. The electromagnetic interference (EMI) grounding protection method for said connector assembly using said multi-directional conductive housing according to claim 1, wherein said metallic braided shied is made of stainless steel or the like.

3. The electromagnetic interference (EMI) grounding protection method for said connector assembly using said multi-directional conductive housing according to claim 1, wherein said conductive housing is made of a metal-infused conductive material selected from the group consisting of plastic, resin, and nylon.

4. The electromagnetic interference (EMI) grounding protection method for said connector assembly using said multi-directional conductive housing according to claim 1, wherein said multi-directional conductive housing is made of a stainless steel fiber-filled material selected from the group consisting of plastic, resin, and nylon.

5. The electromagnetic interference (EMI) grounding protection method for said connector assembly using said multi-directional conductive housing according to claim 1, wherein said metallic compression limiter is made of aluminum, or the like.

6. The electromagnetic interference (EMI) grounding protection method for said connector assembly using said multi-directional conductive housing according to claim 1, wherein said bolt is made of stainless steel, or the like.

7. The electromagnetic interference (EMI) grounding protection method for said connector assembly using said multi-directional conductive housing according to claim 1, wherein said metallic device onto which said multi-directional conductive housing is mounted, is made of aluminum, or the like.

8. The electromagnetic interference (EMI) grounding protection method for said connector assembly using said multi-directional conductive housing according to claim 7, wherein said metallic device onto which said multi-directional conductive housing is mounted, is an aluminum automotive transmission.

9. An electromagnetic interference (EMI) grounding protection method for a connector assembly using a multi-directional conductive housing, comprising the steps of:

conducting said EMI generated by a source toward a metallic braided shield, said metallic braided shield being secured and mounted onto said multi-directional conductive housing by a metallic clamp;

conducting said EMI from said metallic braided shield to said metallic clamp and to said multi-directional conductive housing, wherein said multi-directional conductive housing has a base portion having a plurality of pads passing through slits of a silicone seal and contacting a metallic device onto which said connector assembly is mounted, said silicone seal being located between said multi-directional conductive housing and said metallic device, said silicone seal houses a bolt and a corresponding metallic limiter, said bolt having a head that mounts onto said corresponding metallic limiter and said silicone seal, and said silicone seal receiving a bottom portion of said multi-directional conducting housing; and thereafter, conducting said EMI from said multi-directional conductive housing and through said pads of said base portion of said multi-directional conductive housing, and ultimately, to said metallic device resulting in EMI protection of said connector assembly by grounding said EMI.

10. The electromagnetic interference (EMI) grounding protection method for said connector assembly using said multi-directional conductive housing according to claim 9, wherein said metallic braided shied is made of stainless steel or the like.

11. The electromagnetic interference (EMI) grounding protection method for said connector assembly using said multi-directional conductive housing according to claim 9, wherein said multi-directional conductive housing is made of a metal-infused conductive material selected from the group consisting of plastic, resin, and nylon.

12. The electromagnetic interference (EMI) grounding protection method for said connector assembly using said multi-directional conductive housing according to claim 9, wherein said multi-directional conductive housing is made of a stainless steel fiber-filled material selected from the group consisting of plastic, resin, and nylon.

13. The electromagnetic interference (EMI) grounding protection method for said connector assembly using said multi-directional conductive housing according to claim 9, wherein said metallic device, onto which said conductive housing is mounted, is made of aluminum, or the like.

14. The electromagnetic interference (EMI) grounding protection method for said connector assembly using said multi-directional conductive housing according to claim 13, wherein said metallic device, onto which said multi-directional conductive housing is mounted, is a metallic automotive compressor.

* * * * *